(12) United States Patent
Lesaint et al.

(10) Patent No.: US 6,578,005 B1
(45) Date of Patent: *Jun. 10, 2003

(54) METHOD AND APPARATUS FOR RESOURCE ALLOCATION WHEN SCHEDULE CHANGES ARE INCORPORATED IN REAL TIME

(75) Inventors: David Lesaint, Ipswich (GB); Christos Voudouris, Ipswich (GB); Nader Azarmi, Colchester (GB); Robert N. W. Laithwaite, Bucklesham (GB); John J O'Donoghue, Ispwich (GB); Andrew P Noble, Richmond (GB); Paul Walker, Bolton (GB); Ian S Alletson, Rochdale (GB)

(73) Assignee: British Telecommunications public limited company, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,423

(22) PCT Filed: Nov. 12, 1997

(86) PCT No.: PCT/GB97/03118
§ 371 (c)(1),
(2), (4) Date: Mar. 19, 1998

(87) PCT Pub. No.: WO98/22897
PCT Pub. Date: May 28, 1997

(30) Foreign Application Priority Data

Nov. 22, 1996 (EP) .............................................. 96308478

(51) Int. Cl.[7] .............................................. G06F 17/60
(52) U.S. Cl. ................................... 705/8; 705/9; 705/7
(58) Field of Search .................... 705/8, 7, 9

(56) References Cited

U.S. PATENT DOCUMENTS 5,111,391 A   5/1992  Randall et al. ............... 705/9

5,260,868 A * 11/1993 Gupta et al. ................ 700/100

(List continued on next page.)

FOREIGN PATENT DOCUMENTS

| EP | 0 678 818 | 10/1995 |
|----|-----------|---------|
| EP | 0 938 714 | 1/2001 |
| WO | WO 95 26535 A | 10/1995 |

OTHER PUBLICATIONS

Hsueh et al, "On–line Schedulers for Pinwheel Tasks Using the Time–Driven Approach", Dept. of Inf. & Compt. Sci. California University, Irvine, CA, USA, Conference Title: Proceeding. 10th EUROMICRO Workshop on Real–time Syatems, Jun. 1998.*

(List continued on next page.)

*Primary Examiner*—Tariq R. Hafiz
*Assistant Examiner*—Akiba Robinson-Boyce
(74) *Attorney, Agent, or Firm*—Nixon & Vanderhye P.C.

(57) ABSTRACT

A plurality of resources, typically service operatives, are allocated to a plurality of tasks by a method in which initial information relating to the tasks to be allocated and the resources available to perform the tasks is provided. An initial series of schedules is first generated allocating resources to the tasks, and then modifying the individual schedule of at least one resource in response to updated information. Changes to individual schedules may be made in response to such updated information independently of the schedule generation. The initial, series of schedules may be generated in a two-stage process in which a rule-based system allocates tasks selected as being difficult to allocate (e.g., because they are linked to other tasks). then a stochastic (non-systematic) search system compiles the rest of the schedule. Periodically, the stochastic system may be interrupted to allow a further rule-based system to analyze the schedules created thus far, and fix the best ones in the schedule, so that the stochastic system can then concentrate on improving the remaining schedules. In order to allow the system to handle rapid changes in the requirements for tasks and the resources, on a scale faster than the time required to generate the schedules, a schedule modification system is arranged to make changes in the short term in between schedule updates delivered by the schedule generation system.

107 Claims, 16 Drawing Sheets

U.S. PATENT DOCUMENTS

| | | | |
|---|---|---|---|
| 5,343,388 A | * 8/1994 | Wedelin | 705/8 |
| 5,467,268 A | 11/1995 | Sisley et al. | 364/403 |
| 5,524,077 A | * 6/1996 | Faaland et al. | 705/8 |
| 5,799,286 A | * 8/1998 | Morgan et al. | 705/30 |
| 5,923,552 A | * 7/1999 | Brown et al. | 700/100 |
| 5,943,652 A | * 8/1999 | Sisley et al. | 705/9 |

OTHER PUBLICATIONS

Cott et al, Minimizing the effects of batch process variability using online schedule modification, Computers & Chemical Engineering, vol. 13, No. 1–2, p. 105–13, 1989.*

Garwood et al, "Work Management System", British Telecommunications Engineering, vol. 10, Oct. 1991, 204–210.

Tsang, "Scheduling Techniques—a Comparative Study", 8438 BT Technology Journal, Jan. 13, 1994, No. 1, Ipswich, Suffolk, GB.

Patent Abstracts of Japan (from EPO) for JP Publication 06139248 published May 20, 1994.

R. Laithwaite, "Work Allocation Challenges and Solutions in a Large–Scale Work Management Environment", BT Technol J., vol. 13, No. 1, Jan. 1995.

Dr. Jörg Schulte et al., "Solving the Scheduling Dilemma by Combining Proactive and Reactive Scheduling Modules in a Manufacturing Execution System", Notes for ILOG Conference, Jul. 1996.

Bill Morris et al., "Workforce Allocation in the Core Network: NOMS2 and WORK Manager", British Telecommunications Engineering, vol. 14, Jul. 1995.

G. J. Garwood et al., "Work Management System", British Telecommunications Engineering, vol. 10, Oct. 1991.

D J Parrott et al., "Comparing the WMS Real Time Algorithm with AIP Predictive Schedulers", BT Technol J., vol. 12, No. 4, Oct. 1994.

J Simpson et al., "Experience in Applying OR Techniques to the Solution of Practical Resource Management Problems", BT Technol J, vol. 13, No. 1, Jan. 1995.

* cited by examiner

METHOD AND APPARATUS FOR RESOURCE ALLOCATION WHEN SCHEDULE CHANGES ARE INCORPORATED IN REAL TIME

BACKGROUND OF THE INVENTION

1. Field of the Invention

This invention relates to a method for optimising the allocation of a plurality of resources to a plurality of tasks, and to an apparatus for performing such a method. It is particularly suited for use in situations where the availability of resources, and the tasks to be performed, both change dynamically. An example of such a situation is the allocation of tasks to a field force of personnel, for example ambulance or taxi drivers, a vehicle repair call-out field force, or a maintenance field force for a distributed system such as an electricity or water supply system or a telecommunications network.

2. Related Art

In such situations the workload is highly variable and volatile, and tasks have to be allocated in real-time since the necessary response times are of the order of the duration of the tasks themselves, and very much shorter than a technician's working day. The durations of the individual tasks are themselves very variable and often unpredictable, which affects resource availability for those tasks awaiting allocation.

A prior art system, described in International patent application no. WO 95/26535, describes a system in which, for each resource, the time at which it will become available is estimated. Each task is assigned a time-dependent function, referred to hereinafter as a "cost function". This cost function is a measure of the consequences of a resource being allocated to the task at a given time. For example, if a resource fails to be allocated within a deadline which has been guaranteed to a customer, compensation may be payable to the customer. Travelling time to, from, and between tasks, and idle time (incurred if a resource cannot perform the next allocated task immediately the resource becomes available to perform it, for example before access to premises can be gained, or before a preceding task in a sequence has been done) are other factors. For each combination of tasks with resources a predicted cost can be determined. This cost is the sum of the values of the time-dependent functions for each task at the time that the resource allocated to it becomes available to perform it. The combination giving the lowest overall cost is then determined.

Additional features are disclosed in the above-mentioned patent which ensure incompatible task/resource combinations are not allocated, and which reduce the complexity of the calculation by prioritising the tasks and resources. The allocation schedule can be kept up to date by running the program periodically, (for example every five minutes) or on demand (for example when a technician requires a new task, or when a new task request is added to the system).

This system requires a large amount of processing power because the entire allocation schedule is constructed from scratch every time the program is run. Such an arrangement is possible when the allocation criteria are themselves relatively simple, even though many individual elements (tasks and resources) may be involved. The problem becomes more intractable when there are complex inter-relationships between the tasks or the personnel involved. For example some tasks may require two or more people to be simultaneously at different places in order to determine the integrity of a connection between the two locations. In other circumstances, tasks may have to be performed in a specified sequence, and different personnel may be required for their performance.

Because the prior art system runs in real time, time available to run the program is limited, so it can only schedule one task, or at most a very few tasks, ahead. This is likely to result in a schedule which is sub-optimal in the longer term, particularly if tasks which will take a large proportion of the day, or even several days, are involved, since the availability of resources in the longer term cannot easily be taken into account in such a system.

Another problem with this real-time process is that when there is a task with a high priority, and several of the technicians could do it, the prior-art real-time process described above schedules it as the next task for a specific individual technician. This would normally be selected according to which technicians are closest to the geographical location of the task, and which are predicted to finish their present task first. However, if the selected technician is delayed on his current task, such that the target time for this next task is jeopardised, other technicians who become available cannot be allocated it instead, unless the whole scheduling process is re-run. Until this happens, the task remains scheduled for the first technician.

An alternative approach, which deals readily with complex inter-relationships and long-term tasks, is to build up a schedule for a complete day (or even longer). This can be done very rigorously, by allocating a lot of computer time to it (for example overnight). However, the result is not readily adaptable to changing circumstances, simply because of the large amount of computer time devoted to preparing it in the first place.

A proposal has been made by G J Garwovod and A C Robinson: "Work Management System" in British Telecommunications Engineering Journal: Vol 10 October 1991 to run two different systems, one according to each of the above two approaches: a "real time" system, for dealing with relatively straightforward but urgent cases which are suitable for real time scheduling, and a "schedule building" system for more complex but less urgent cases, which are more suited to a complex but much slower scheduling process. However, this has a number of drawbacks. Firstly, an initial decision has to be made as to which resources and tasks to allocate to each system. Resources cannot switch back and forth between systems (for example to perform a short-term task in one system to fill-in between two larger tasks in the other). A link may be provided between the two systems so that if one of the complex schedules fails for an unforseen reason, the resources and tasks which can no longer perform, or be performed in, the original complex schedule are transferred to the real-time scheduling system. However, the real-time scheduling system is not configured to readily deal with such tasks. In particular, the real time scheduler is constrained to only consider tasks whose target time is imminent, as the need to respond quickly precludes inspecting any more tasks.

SUMMARY OF THE INVENTION

According to the invention there is provided a task-allocation apparatus comprising:

input means for providing information relating to the tasks to be allocated and the resources available to perform the tasks, schedule generation means to allocate the resources to the tasks, thereby generating, for each resource, an initial schedule, storage means for storing the initial schedules, updating means for receiving, from the input means, updated information relating to the tasks and resources, and modifying means for modifying the initial schedule of at least a first resource in response to such updated information, whereby changes to the initial schedules may be made in response to such updated information, independently of the schedule generation means.

According to another aspect there is provided a method of allocating a plurality of resources to a plurality of tasks, the method comprising the use of a computer to perform the following functions:

providing initial information relating to the tasks to be allocated and the resources available to perform the tasks, generating, for each resource, an initial schedule to allocate the resources to the tasks, storing the initial schedules, providing updated information relating to the tasks and resources, and modifying the initial schedule of at least a first resource in response to such updated information, whereby changes to individual schedules may be made in response to such updated information independently of the process of generating the initial schedules.

In this arrangement, there is a closer co-operation between the two basic processes than envisaged in the prior art arrangements. The initial schedule is built up from tasks which, for some reason, are difficult to allocate. This schedule is then completed, or modified, using updated information.

Preferably, the initial schedules are generated periodically, and the initial schedules so generated are modified in response to the receipt of data between such periodic generation of the initial schedules. This periodicity can be selected by the user to suit his own requirements. If the schedules are generated relatively frequently, a user can run the process with the initial generation process dominating, which will ensure the current initial schedule is up to date, with only a few schedules being modified by new data between runs of the generation process. Alternatively, if the schedules are generated less frequently, the modification process will dominate, (because more schedules will have been modified since the latest run of the generation process), but this allows more time between updates to generate a more rigorous solution.

Moreover, the user can select how much of the processing to be carried out by each process. The more that is done by the initial process, the more rigorous the schedule generated. However, this also requires more processing time, during which the schedule being generated is becoming obsolete as new input data arrives. The modification process may be suspended during the periodic generation of the initial schedules, the updated information being used to modify the initial schedules when their generation is complete. Alternatively, the modification process may continue during the generation of the initial schedules, the schedules so modified being input as modifications to the initial schedules when their generation is complete.

If a substantial update data item is received, which would make the existing schedules, or those currently being generated, redundant, the schedule generation process may be initiated at a time other than that determined by the periodicity referred to above.

In a preferred arrangement the schedule generation function comprises a first deterministic stage for scheduling selected tasks, and a second optimisation stage for scheduling the remaining tasks, and wherein the second stage treats the tasks scheduled by the first stage as fixed. In the preferred embodiment the second stage operates according to a stochastic process.

Preferably, groups of linked tasks involving more than one of the resources, or forming a sequence of tasks are selected for scheduling by the first, deterministic, stage.

This architecture allows scheduling to be carried out in several stages, with more changeable, but easier to allocate, tasks being handled in a different manner to tasks which are more difficult to allocate, but less subject to change. The system is conveniently arranged so that optimised schedules are generated periodically, the modification process making short term changes in between the generation of such schedules. This allows the schedule generation process more time to generate each schedule, allowing it to generate a more optimal solution, and/or use more data (e.g. further ahead in time) than would be the case if its run time were constrained by a need to track short term changes in real time.

The architecture described is modular, so that the individual stages of schedule generation and modification can each be adapted or replaced independently of the others.

The terms "deterministic" and "stochastic" in this specification are to be understood as distinguishing between the different methods of operation of the two stages. The deterministic stage operates according to allocation rules which are input to the system by the system operator, based on experience, to generate a partial schedule. This partial schedule is a rigourously determined optimum solution for scheduling those tasks selected to be input to it. The optimisation stage next adds further tasks, which are relatively easy to schedule to the partial schedule to generate a full, but in general non-optimal, schedule, and then searches for improvements on that non-optimal solution, but with the constraint that it cannot change those parts of the solution generated by the deterministic stage. In the described embodiment the optimisation process is a Simulated Annealing process. This is an example of a stochastic search technique, that is, a searching technique using a constrained random process; that is a process with an element of randomness, with constraints or weightings to concentrate the search in the areas most likely to yield a solution but not completely areas perceived as less likely. These techniques are useful for finding near-optimal solutions when the "solution space" to be searched has known general characteristics, so that the process can be guided to the best areas to search in. Other stochastic techniques such as "Hill Climbing", "Tabu Search" and "Genetic Algorithm" techniques, or exhaustive systematic searches may be used in appropriate circumstances, as will be described. The schedule generation means may also comprise a third, post-optimisation stage, in which the schedules created by the optimisation stage are analysed to identify individual schedules requiring further optimisation, and such schedules are input into a further iteration of the optimisation stage for further optimisation, the further iteration of the optimisation stage treating the schedules not so identified as fixed.

The schedule modifying process may comprise a plurality of selection steps, in each of which the plurality of tasks waiting to be performed is assessed to determine if a task of a given priority suitable for performance by the first resource (typically, one which has reported in requesting a new task) is available, and such a task is allocated to the first resource if identified, the selection steps each being arranged to identify tasks of successively descending priority, such that tasks of high priority are allocated in preference to lower priority tasks, whether or not in the initial optimised schedule for the resource. At least one of the selection steps may first determine whether the initial optimised schedule of the resource includes a performable task of the given priority, and select said task if present, or, if the initial optimised schedule of the resource does not contain such a task, determine if a task of that priority exists which has not been scheduled, and select such a task if present.

In this specification the term "scheduled task" means the task currently provisionally allocated to a resource—this task may eventually be allocated to another resource if the schedule is revised. As already discussed, prior art systems allocate tasks to specific resources in advance, to the exclusion of any other suitable resources which, in the event, become available first and have another feasible task allocated. In the system of the present invention, although a high priority task may be scheduled for one specified technician initially, another technician who is suitably positioned and skilled to perform the task may be allocated that task if he calls in first, if to do so produces a net benefit to the schedules. The original schedule for the second technician is then suspended, and each task in that schedule will become unscheduled until a technician suited to the task calls in. This may be the first technician, if his technical skills and geographical location are suitable, and if he calls in before the task is allocated elsewhere. It could be the second technician (i.e. the one for whom it was originally scheduled) if, when he completes the first task, there is still time to perform his originally scheduled task. However, typically the task will be allocated to a third technician, whose own schedule will be interrupted in turn.

To avoid disruption to schedules propagating uncontrollably, the system may be arranged to limit changes to a selected group of resources and tasks. These may be those resources which have related characteristics, such as similar current geographical locations, and/or estimated time to completion of current task, and/or skills, and/or type of tasks they are currently scheduled to perform. A modification to the schedules limited to the area of the "solution space" (the notional multi-dimensional matrix of resources, tasks, time, location etc.) represented by those resources ensures that any changes to the schedules will propagate relatively slowly through the solution space, and will therefore be unlikely to result in a total breakdown of the scheduling. In particular, if certain tasks, identified as difficult to allocate, are not permitted to be disrupted, this ensures that "islands of stability" will exist in the solution space, which will tend to reduce the rate at which such disruptions propagate through the solution space.

Further tasks may be added to the plurality of tasks to be considered by the schedule modification process, after generation of the initial schedules, thereby allowing the system to allocate urgent tasks on a shorter timescale than the generation of the initial schedules.

According to a third aspect, there is provided a computer apparatus for allocating a plurality of tasks to a plurality of resources, said computer apparatus comprising a central processing unit, a memory, an input device and an output device, said memory containing a program for controlling the computer and which is arranged to store an initial schedule, based on predicted availability of resources, task priorities, and suitability of tasks to resources, and performing the following steps:

when a resource becomes available, assessing the plurality of tasks waiting to be performed, to determine if a high priority task suitable for performance by the resource is available, and allocating it to the resource;

if no such task is available for the resource to perform, assessing the next task on the resource's initial optimised schedule to determine if it can be performed, and allocating it to the resource if it can be performed;

if the said next task is not available for the resource to perform, allocating to the resource a lower priority task from the plurality of tasks.

BRIEF DESCRIPTION OF THE DRAWINGS

An embodiment of the invention will now be described, by way of example only, with reference to the accompanying drawings, in which.

DETAILED DESCRIPTION OF THE EXEMPLARY EMBODIMENTS

Figure 1:
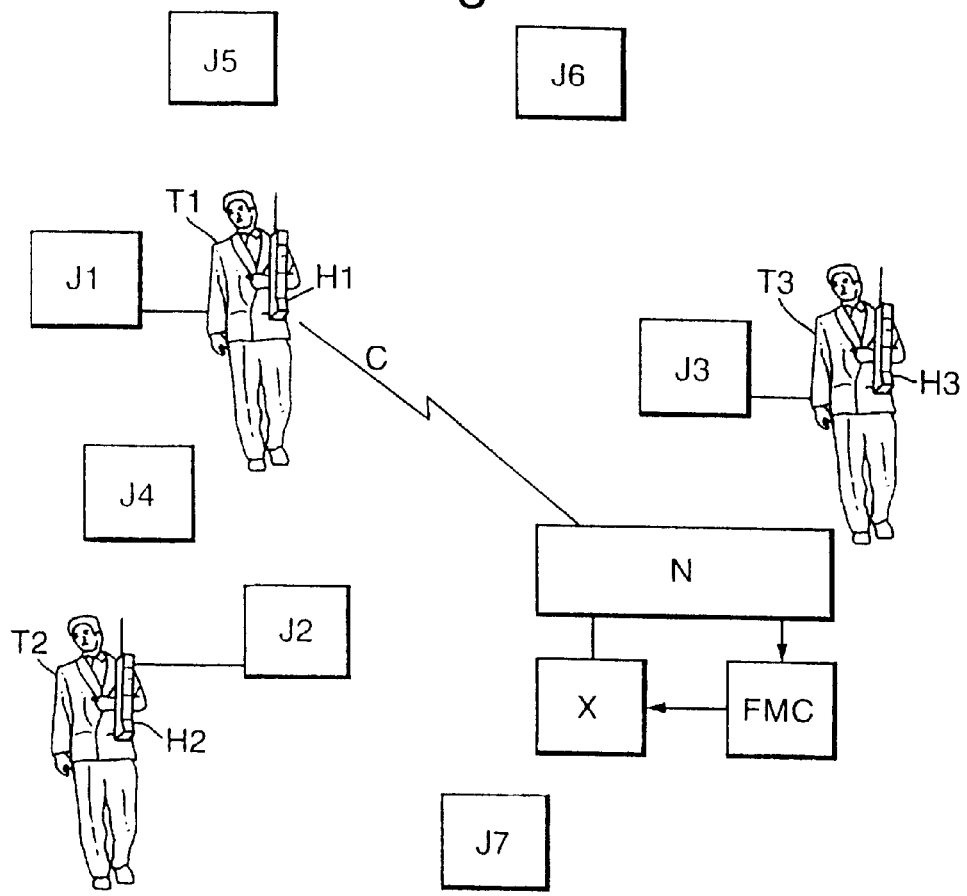
FIG. 1 shows a general arrangement of a system including a computer X, configured to operate according to the invention.

Referring to FIG. 1, there is shown a telecommunications system, represented by a block N, which is monitored by a fault-monitoring system FMC. The fault monitoring system FMC detects faults in the network which require attention, and also receives inputs from a human operator e.g. to schedule planned maintenance, to generate task requests J1, J2, J3, J4, J5, J6, J7 to be performed by a field force of technicians T1, T2, T3. The task requests are input to a resource allocation system comprising an apparatus in the form of a computer X for allocating resources to tasks, which can communicate through the telecommunications network N with hand-held terminals H1, H2, H3, as required. As shown in FIG. 1, terminal H1 is currently in communication with the computer X through a connection C. Each of the hand-held terminals may be a Husky model FS12 produced by Husky Computers Ltd of Coventry, England, but other suitable equipment may be used.

In a real situation there will be many technicians (typically a few hundred) and tasks. Typically a workforce of one hundred technicians might perform six hundred tasks in one day. Therefore in a typical day approximately 600 tasks will be added to the system, and 600 tasks removed as they are completed. All the new tasks, and a proportion of the completions, will require changes to the day's program. Thus, although each individual technician's schedule only changes a few times a day, two changes are made to the overall schedule in an average minute during an 8 hour working day. Of course, this figure masks considerable fluctuation, for example a large number of inputs occur at the beginning of the working day as faults which have occurred overnight are discovered and reported.

For illustrative purposes the present example has just three technicians T1 T2, T3 who are provided, respectively, with the terminals H1, H2, H3. The technicians are presently engaged on tasks J1, J2, J3 and there are four further tasks J4, J5, J6, J7 awaiting attention. The technicians T1, T2, T3 can use their terminals H1, H2, H3 for reporting completion of a task and for receiving instructions from the computer X for performing the next task.

For illustrative purposes, the three technicians T1, T2, T3 may be considered as part of a field force for performing tasks on the telecommunications network N. However, the system to be monitored need not be a telecommunications system, and may be quite separate from the telecommunications system through which the terminals communicate with the computer X.

Figure 2:
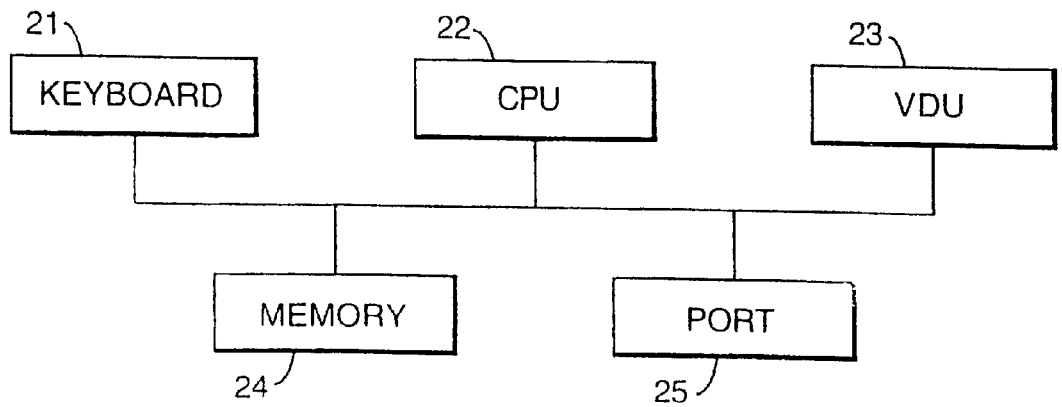
FIG. 2 shows the components of the computer X of FIG. 1.

The basic components of the computer X are shown in FIG. 2. These comprise a keyboard 21, a central processing unit (CPU) 22, a visual display unit (VDU) 23, a memory 24 and an input/output port 25. The data and the programs for controlling the computer X are stored in memory 24. The input/output port 25 connects the computer to the telecommunications system which provides the communication links between the computer X and the hand held terminals H1, H2, H3. The computer X can also review alarms from a fault monitoring system associated with the telecommunications network.

The computer X is provided with a main program for allocating the technicians to the tasks. The main program is divided into a set of routines. The general structures of the program, the individual routines, and the method used by the program for allocating technicians to tasks will be discussed in detail later.

In FIG. 1, technician T1 has completed task J1 and contacts the computer X with the aid of his terminal Hi and the communication link C for instructions for his next task. The problem is to determine which of tasks J4, J5, J6, J7 technician T1 should be instructed to perform next. The method used by the main program of computer X takes into account.

whether the technician can perform each individual task;

the time the technician would take to travel to the location of each task;

the time the technician would take to perform each task.

the relevant importance of each task, determined for example by the number of customers affected and any financial penalties which will be incurred if the task is not performed within a specified time period, or at all; and the availability of the other technicians T2, T3.

The availability of these other technicians depends on the times when they each will become available, which in turn depend on the lengths of their current tasks, and the times the technicians started doing them, as well as any travelling time necessary to reach the location of the task from their present locations.

The time that a task will take is subject to some uncertainty, since in many cases tasks involve the investigation and rectification of a reported problem. Until the problem is investigated the time it will take to rectify can only be estimated with a fairly large margin of error. There are also other variable factors, such as the local circumstances of each task, which makes a precise measure difficult. The method used by the program of computer X initially calculates a provisional schedule for each technician, but allows changes to these schedules if a technician reports task completion early, or fails to report at the estimated time, or if new tasks are requested after the provisional schedule has been created.

The method calculates a time-dependent "cost function" for each task. This takes into account the penalty for failing to meet an agreed time. The penalty may be a real monetary cost if compensation is payable to a customer for failures to meet a time, or a 'virtual' cost; e.g. damage to a company's reputation. The penalty is a time-dependent property. In the simplest case the function is zero if the agreed time is met, and a fixed value otherwise. In more complex cases, for example where compensation is payable according to the degree of lateness, it may be some more complex time-dependent function. Scheduling a task earlier than its target time has a contingency value; i.e. if the technician is delayed en route, or takes longer on the task than expected, he may nevertheless complete the task before the target time, so a lower cost is appropriate if the task is not scheduled very close to its target time.

For each possible allocation of a technician to a task, a "technician/task cost", the cost of allocating a given task to a given technician is then estimated. This takes into account the cost of the task failing (which is the same whoever does it) and the probability of the task failing (which varies from one technician to another). This probability depends on the protected finishing time of the technician's current task, the amount of travelling time needed to get to the new task, the estimated duration of the new task, and the target time by which the new task must be done. These factors determine a margin, which is the amount of time by which the other factors can over-run without exceeding the target time or, if negative, the amount of time by which the target time will be missed.

Other factors, such as the amount of non-productive time required for a specified technician to carry out the task (e.g. time spent in travelling, or waiting at the location for access if a "not before" appointment time has been made) can also be taken into account. It should be recognised that these costs are estimates. In some circumstances, the cost may be on a sliding scale, dependent on the time that the task is actually performed. However, in many cases, the actual cost of allocating the task can in reality only take one of two values, the value (negative cost) of success, or the failure cost, but at the time of allocation it is not known which of those values it will take, as unforeseen circumstances may prevent the technician arriving on time (or at all), or may prevent him carrying out the task on time, or at all, if he does arrive. There are further factors, such as the ability of the technician to perform the task (taking into account skills, equipment, and access permits available to each individual), which must also be taken into account. For these factors, the probability of the task failing can take only the values zero (if the technician is suitably qualified, etc.) or 1 (if he is not so qualified). Preferences for types of work, e.g. because a particular technician desires to gain experience in a particular skill, can also be expressed by intermediate values.

These various factors need to be reduced to a common unit of measurement. Conveniently, all the factors may be measured in equivalent units of travel time. The cost of allowing a task to fail can be calculated as equivalent to the amount of non-productive travelling time one is prepared to use in sending a technician to prevent that failure occurring. Alternatively, an equivalent financial value may be used. For example, if compensation at a specified rate is payable to a customer for a missed appointment, non-productive time can be costed such that the time one is prepared to use to avoid paying that compensation is costed at an equivalent value.

The method determines the combination of the technicians and tasks for which the total of the "technician/task cost" values is a minimum. The cost of not allocating a task must also be considered, and this is done by including a non-existent, or "dummy" technician. Other things being equal, if there are more tasks than resources to perform them, the lowest priority task would be scheduled for the dummy technician. For example technician T1 may be currently scheduled to next perform task J5, technician T2 task J7 and technician T3 task J6. Task J4 could be scheduled as a further task for one of these technicians if there is sufficient time remaining in his schedule after the projected completion time of the tasks he has already been scheduled to perform; or otherwise it is scheduled to the dummy technician. When technician T1 reports for instructions, the computer X assesses the current schedule and allocates a task to the technician T1, instructing him over the communications link C. Normally, the task allocated will be the scheduled task (in this case J5), but if a new task (not shown), of higher priority than task J5 is requested, or if the technician T1 reports completion of task T1 unexpectedly early or fails to complete a task at the predicted time, the technician may be allocated a different task, possibly one of the tasks J4, J6 and J7, to ensure the highest priority tasks are still done in time. Technicians T2 and T3 are not given any instructions at this stage as they have not yet completed their current tasks. The scheduling of tasks J6 and J7 to technicians T2 and T3 are provisional, and may be changed, in particular if one of those tasks is allocated to technician T1, or if a high priority task is introduced at short notice.

Various cost analysis algorithms are known for allocating tasks to resources, such as the so called "Hungarian Algorithm" described in a 1955 paper by H W Kuhn "The Hungarian Method for the Assignment Problem" (Naval Research Logistics Quarterly, Vol. 2, pages 83–97) and developed further by M B Wright "Speeding up the Hungarian Algorithm", Computer Operations Research Vol. 17 No 1 pages 95–96 (1990). However the use of these algorithms in real situations is not easy, in particular for inter-related tasks. Moreover, these algorithms cannot schedule more than one task ahead, and the optimal solution may require looking further than he immediately next task.

The programme for controlling the computer X has two main elements. Firstly there is an off-line tour construction programmed system Illustrated generally in FIG. 3, and secondly there is an on-line real-time schedule modification system illustrated generally in FIG. 4. These two systems run independently, but the output of the off-line system is used as the starting point for the operation of the on-line (real-time) system. Each system is typically a computer, controlled by a suitable program. Typically, both systems would be running at once; the real-time system 40 controlling the current allocation of technicians to tasks whilst the schedule generation system 30, 31 prepares the data for the next run of the real-time system 40. Each system will now be described in detail.

Figure 3:
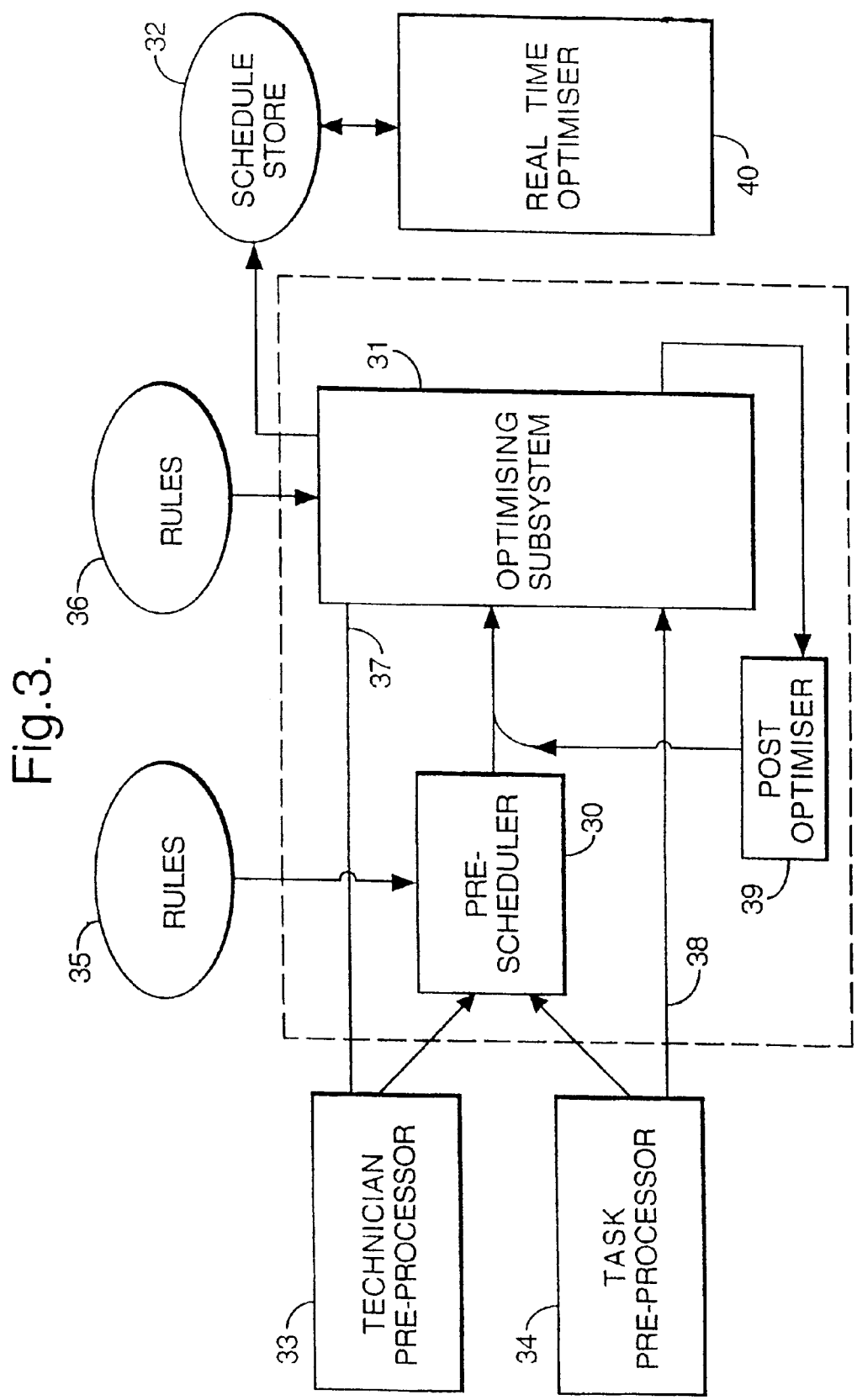
FIG. 3 is a functional block diagram of an initial schedule generation system for generating an initial optimised schedule provisionally allocating resources to tasks. The two principal components are a deterministic "pre-scheduler" stage 30 and a stochastic "optimising subsystem" stage 31.

FIG. 3 shows the general arrangement of the off-line system for generating the initial optimised schedule. This system is operated using stable data, in order to prepare an initial schedule which the real-time system can then use as a basis for its own functioning as the situation develops. The initial optimising schedule can be prepared using a rigorous, but comparatively slow, process, because it does not have to react to changes in its data. For example, the initial optimisation schedule may be prepared overnight, ready for the start of the working day.

The system illustrated in FIG. 3 for the generation of the initial schedule has two central elements; namely a deterministic (rule-based) pre-scheduler 30, and an optimising subsystem 31. The pre-scheduler 30 takes data regarding the resources to be allocated, and the tasks to which they are to be allocated, from inputs 33 and 34 respectively. This data undergoes some pre-processing in the respective inputs 33, 34 before being input to the pre-scheduler 30. The pre-scheduler 30 has details of the technicians available (input 33) and details of those tasks it is to schedule (input 34). It also requires a configuration file which contains parameter values.

The function of the pre-scheduler is to build up the fixed points in each technician's schedule, by scheduling as many as possible of the tasks it is given to satisfy the constraints it is given from a rule store 35. This will result in a "tour" of tasks for each technician. These tours are likely to be partial tours, i.e. tours with some idle time, since the tasks scheduled by the pre-scheduler 30 are only a subset of all the tasks available. In addition the pre-scheduler 30 positions the "next available" time (normally the time that the technician is due to come on duty) breaks, scheduled absences, and the "end of day" event (the time that the technician is scheduled to go off duty) in each technician's tour.

On completion, the results produced by the pre-scheduler are passed to the optimising subsystem 31. The optimising subsystem 31 receives a partial schedule from the pre-scheduler 30 and the data regarding the resources to be allocated, and the tasks not already allocated by the pre-scheduler 30, from inputs 33 and 34 respectively, and generates an initial optimised schedule for passing to a store 32. Both the pre-scheduler 30 and the optimising subsystem 31 follow certain rules, as will be described. The rules may be selected or modified by an operator through respective inputs 35 and 36. the operator also controls the inputs to the pre-processors 33,34, to update details of the technicians and tasks.

As will be described, the optimising subsystem 31 generates a provisional schedule of allocations, by initially positioning further tasks around and between the fixed events (including the difficult-to-schedule tasks) established by the pre-scheduler, and then using a stochastic process to re-allocate these further tasks between the different technicians until an optimum schedule is achieved.

The operation of the schedule generation system can be enhanced by periodically halting the operation of the optimisation stage 31, and running a post-optimisation stage 39. This post-optimisation stage uses certain rule-based criteria to assess the schedule developed thus far, identifying those parts which identify which appear close to optimal, adding these to the fixed partial schedule generated by the pre-scheduling stage 30, and then re-running the optimising sub-system 31 again. This directs the optimising subsystem 31 to concentrate on improving those parts of the schedule identified by the post-optimiser 39 as least optimal. This step can be repeated several times.

Figure 4:
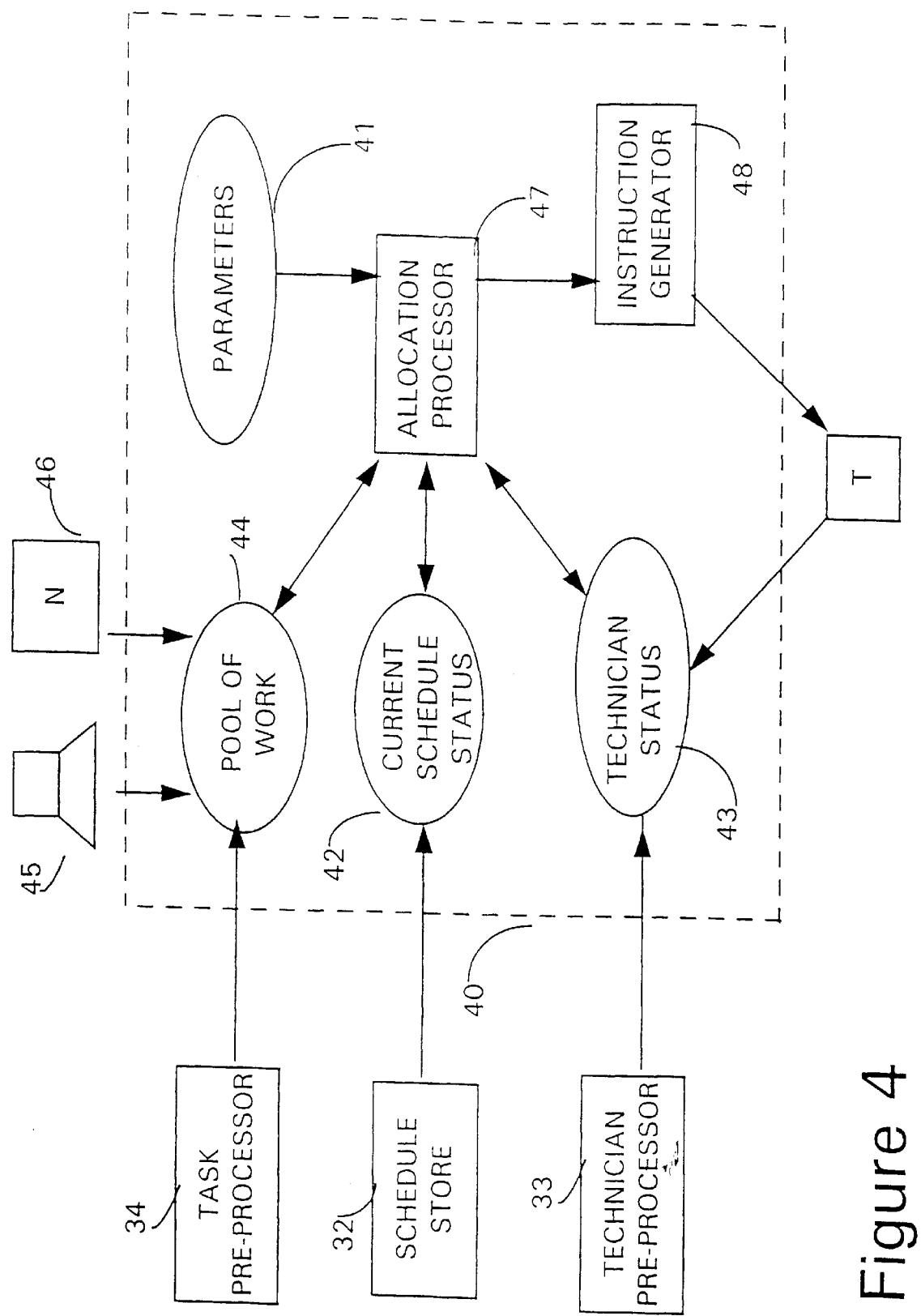
FIG. 4 is functional block diagram of a schedule modifying subsystem 40 for allocating resources to tasks in real time as the resources become available, using the initial optimised schedule generated by the schedule generation system of FIG. 3.

The provisional schedule finally produced by the schedule generation system 30,31 is then used to programme the real-time modifier 40 illustrated schematically in FIG. 4, which is programmed to allocate tasks to technicians according to the provisional schedule, but is capable of departing from the provisional schedule if the real-time circumstances, as distinct from those predicted in the provisional schedule, require it.

FIG. 4 shows, in block diagram form, the principal features of the real-time modifier 40. A schedule status register 42, technician status register 43 and pool of work register 44 each provide an input to, and are in turn updatable by, an allocation processor 47. The registers 42, 43, 44 receive their initial data from the schedule store 32 and the pre-processors 33, 34 respectively, A parameter input 41 allows an operator to set various weightings and other values used by the system.

The technician status register 43 and pool of work register 44 are also updatable from other external sources; the technician interfaces T1 etc. and network interfaces 45, 46 respectively.

The allocation processor 47 uses the current status information in the registers to generate an allocation for a technician when he comes on-line to request instructions. The resulting allocation is passed to an instruction generation unit 48, which generates instructions relating to the newly allocated task, and any associated activities, for transmission to the technician T.

Figure 8:
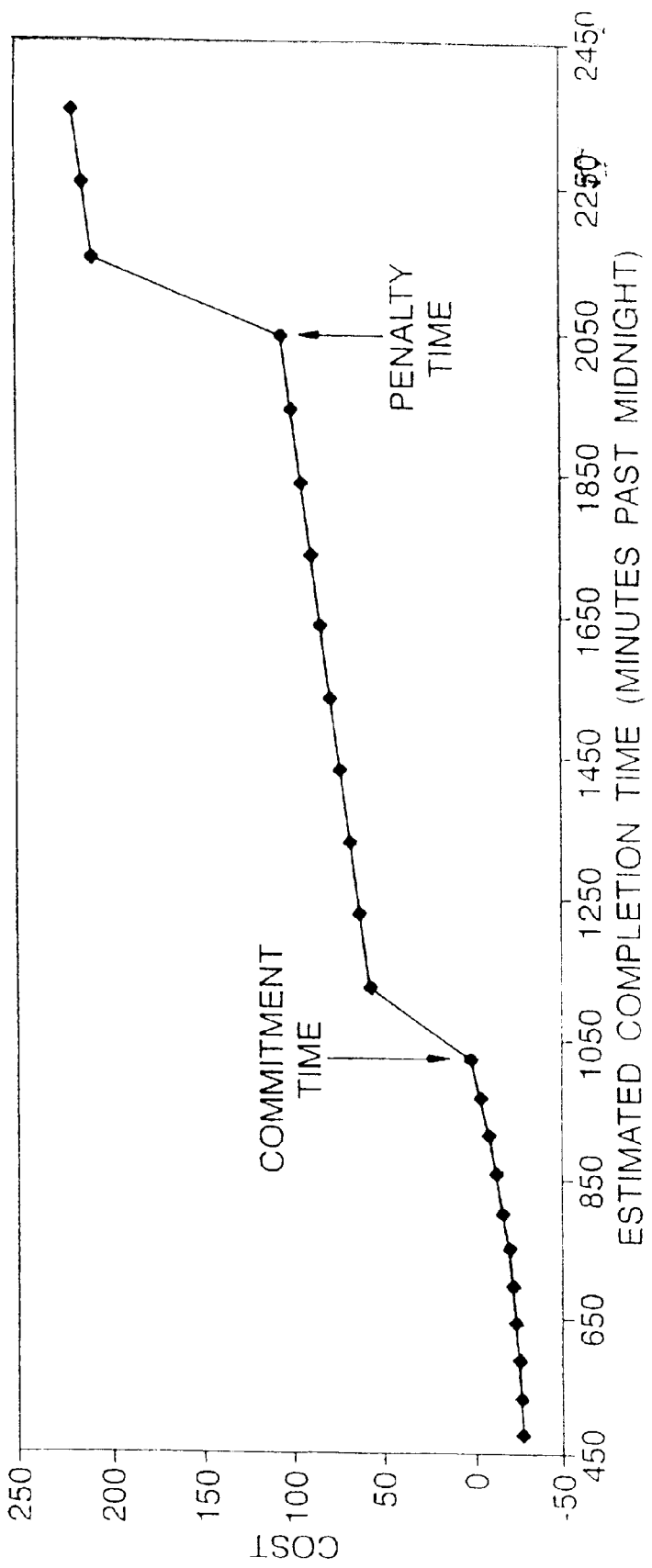
Figure 9:
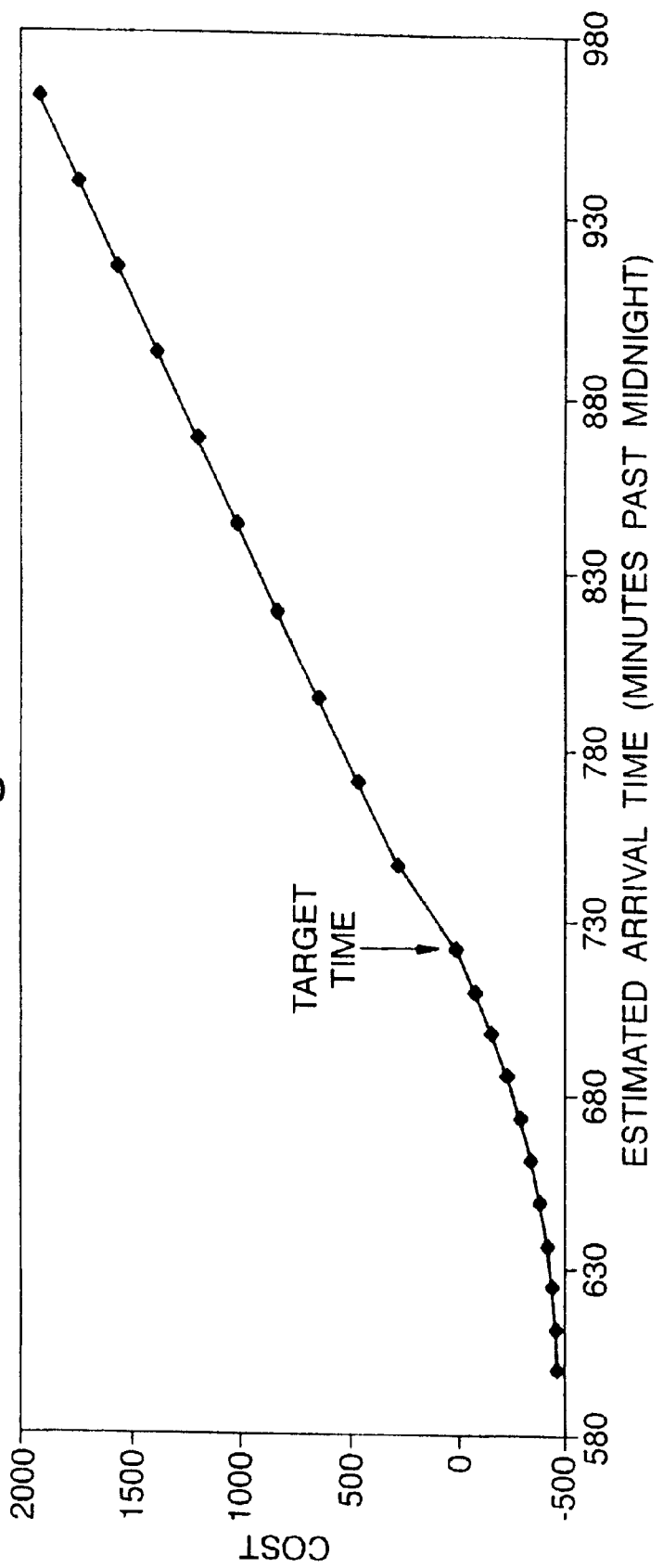
Figure 10:
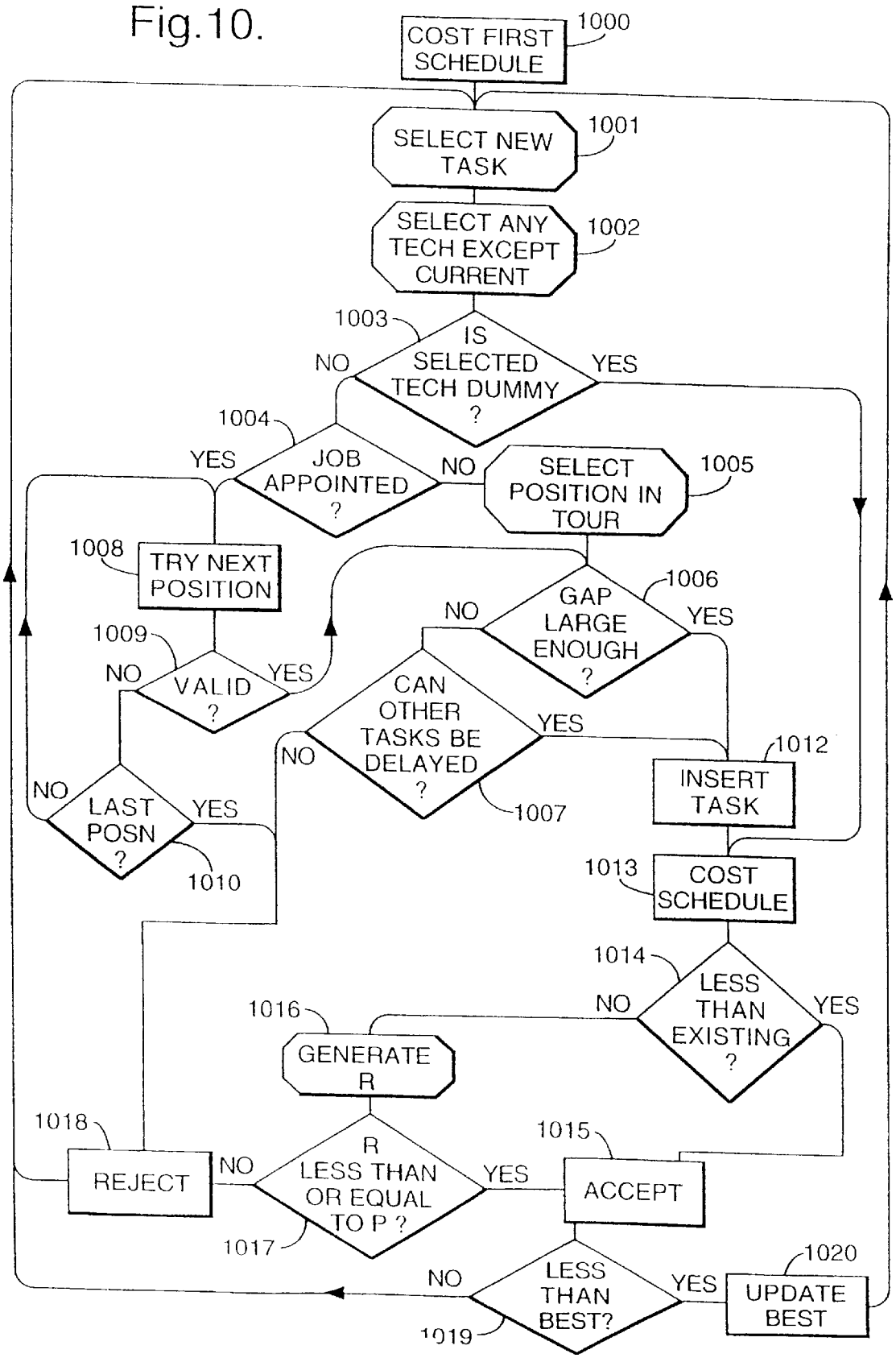
FIG. 10 is a flowchart illustrating the operation of the optimising subsystem 31 of FIG. 3.
Figure 11:
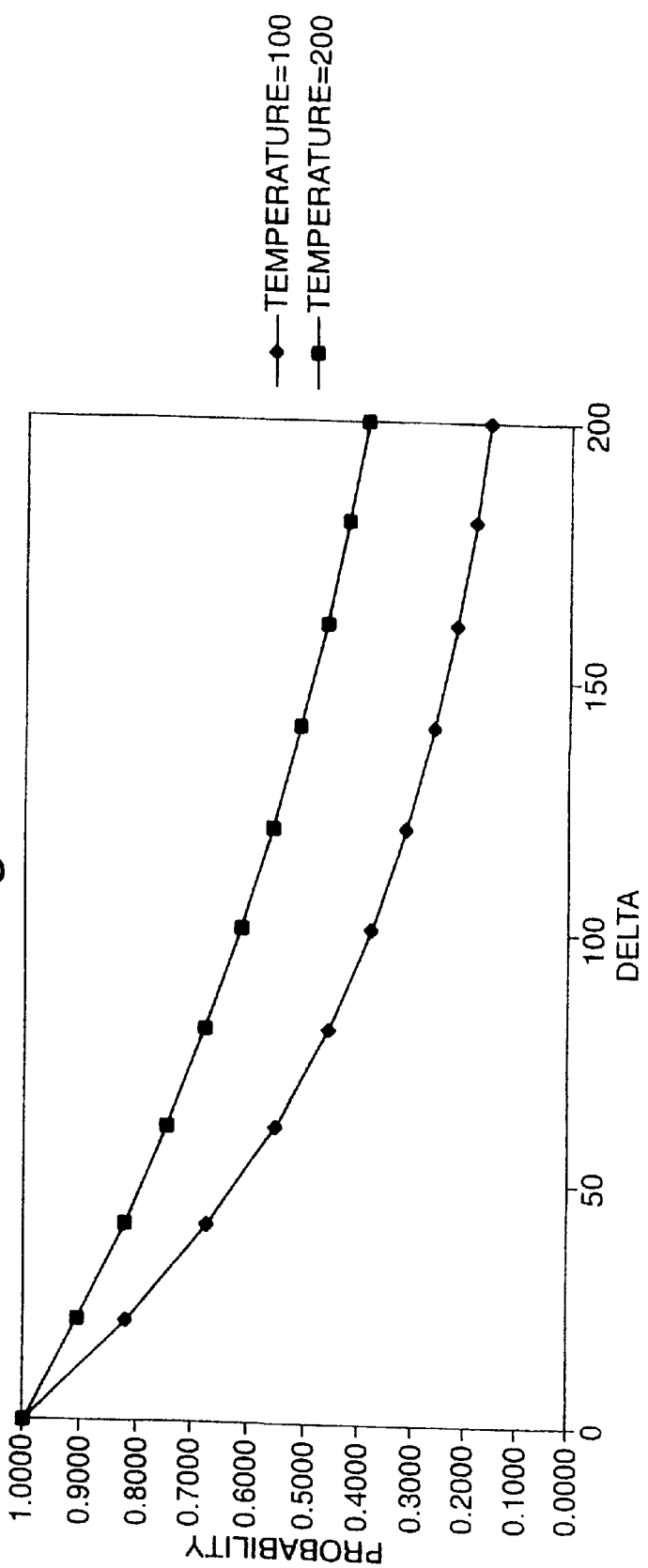
FIG. 11 is an illustration of the Simulated Annealing process used by the optimising subsystem 31.
Figure 12:
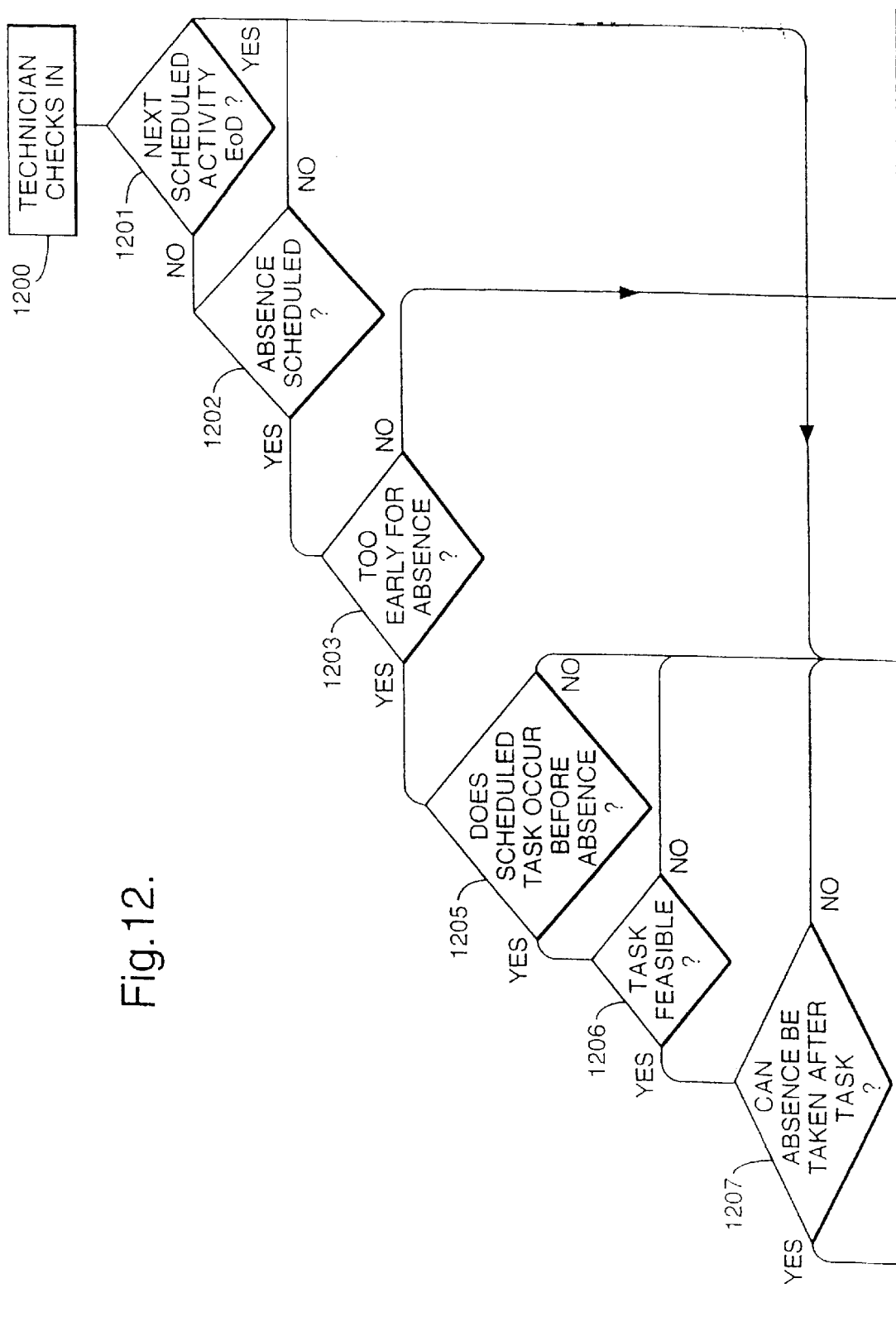
FIGS. 12, 13 and 14 are flowcharts illustrating the method by which tasks are allocated to technicians by the allocation system of FIG. 4, based on the initial optimised schedule generated by the system of FIG. 3, and real-time modifications to that schedule.
Figure 12:
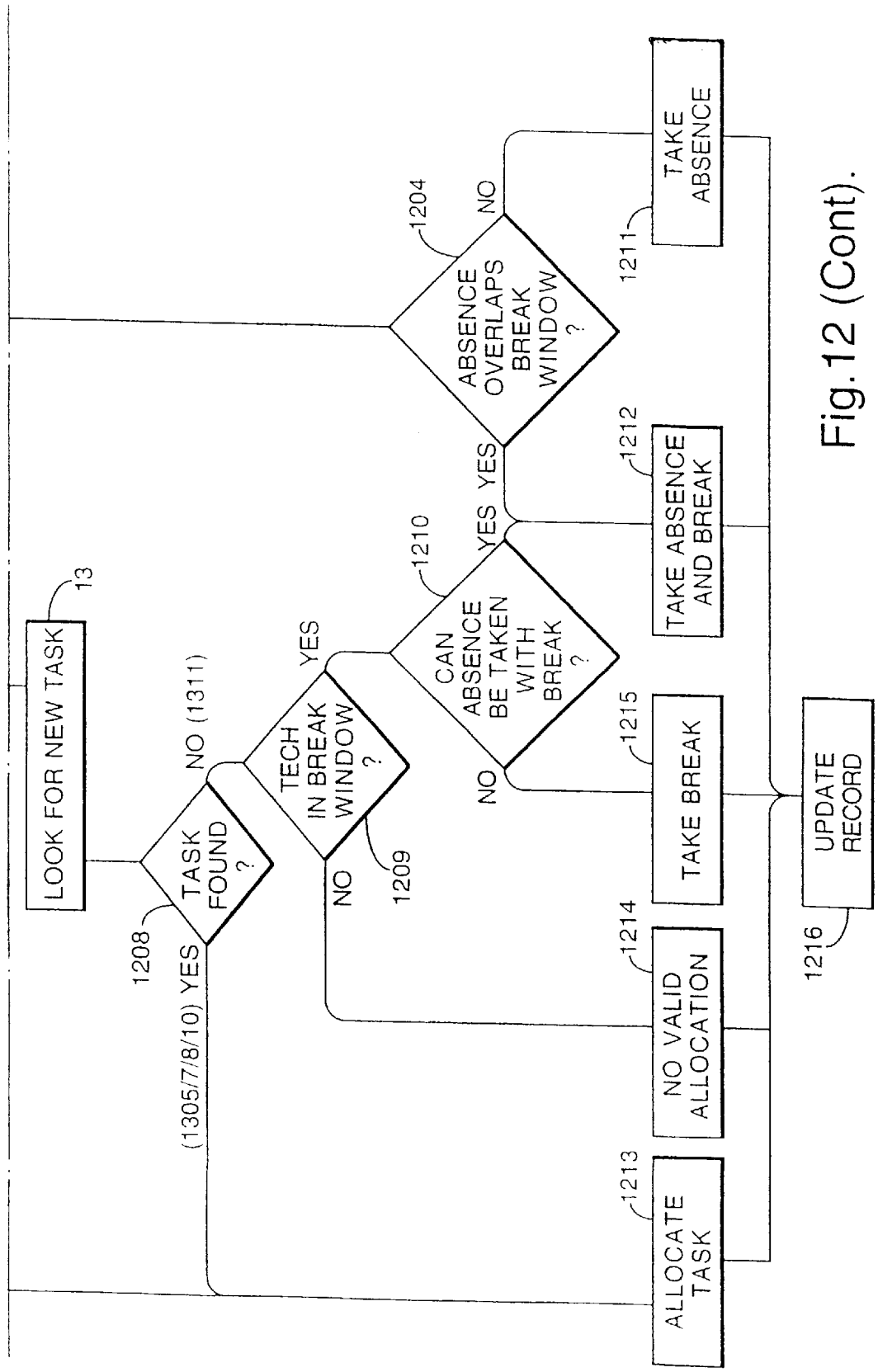
Figure 13:
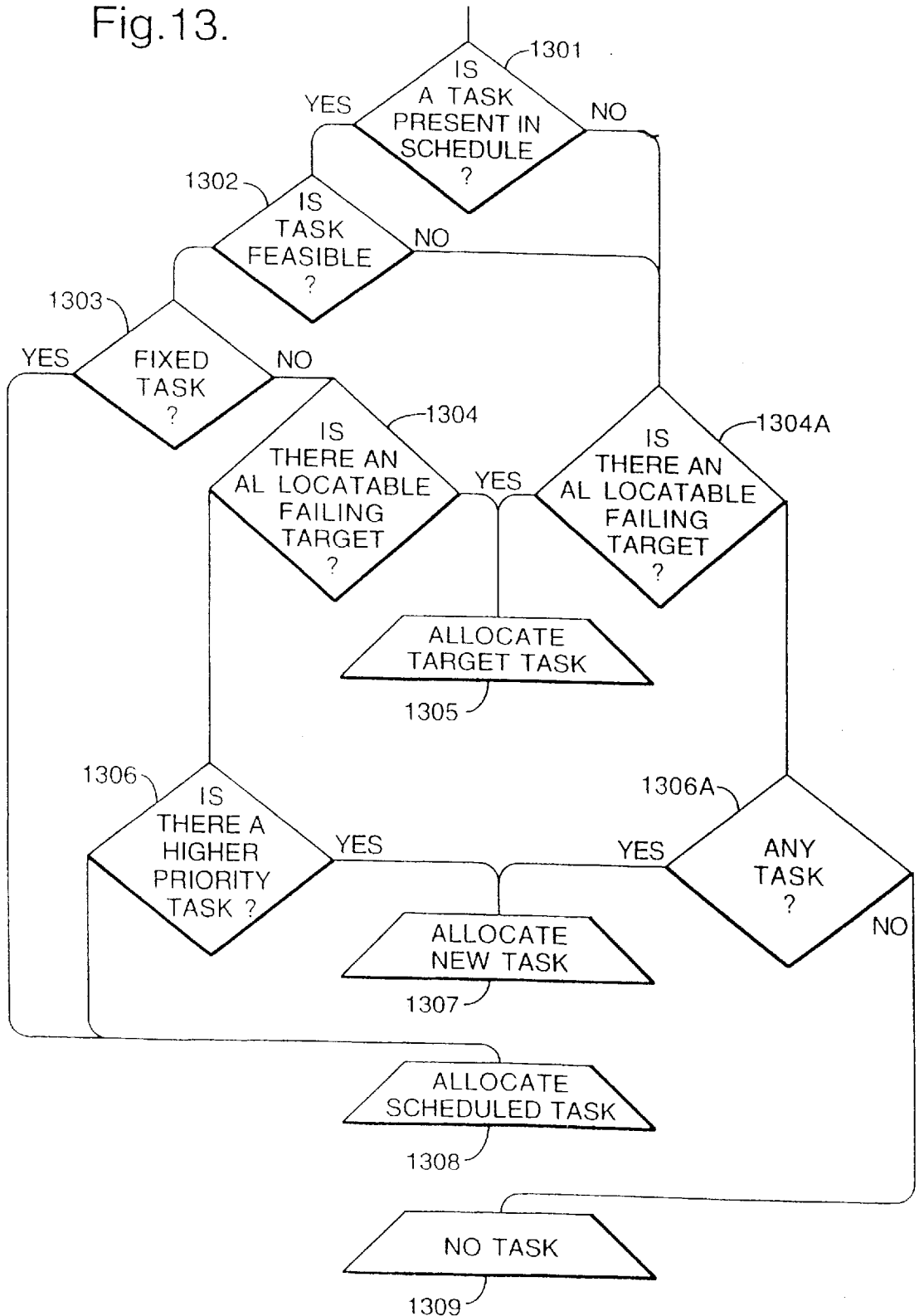
Figure 14:
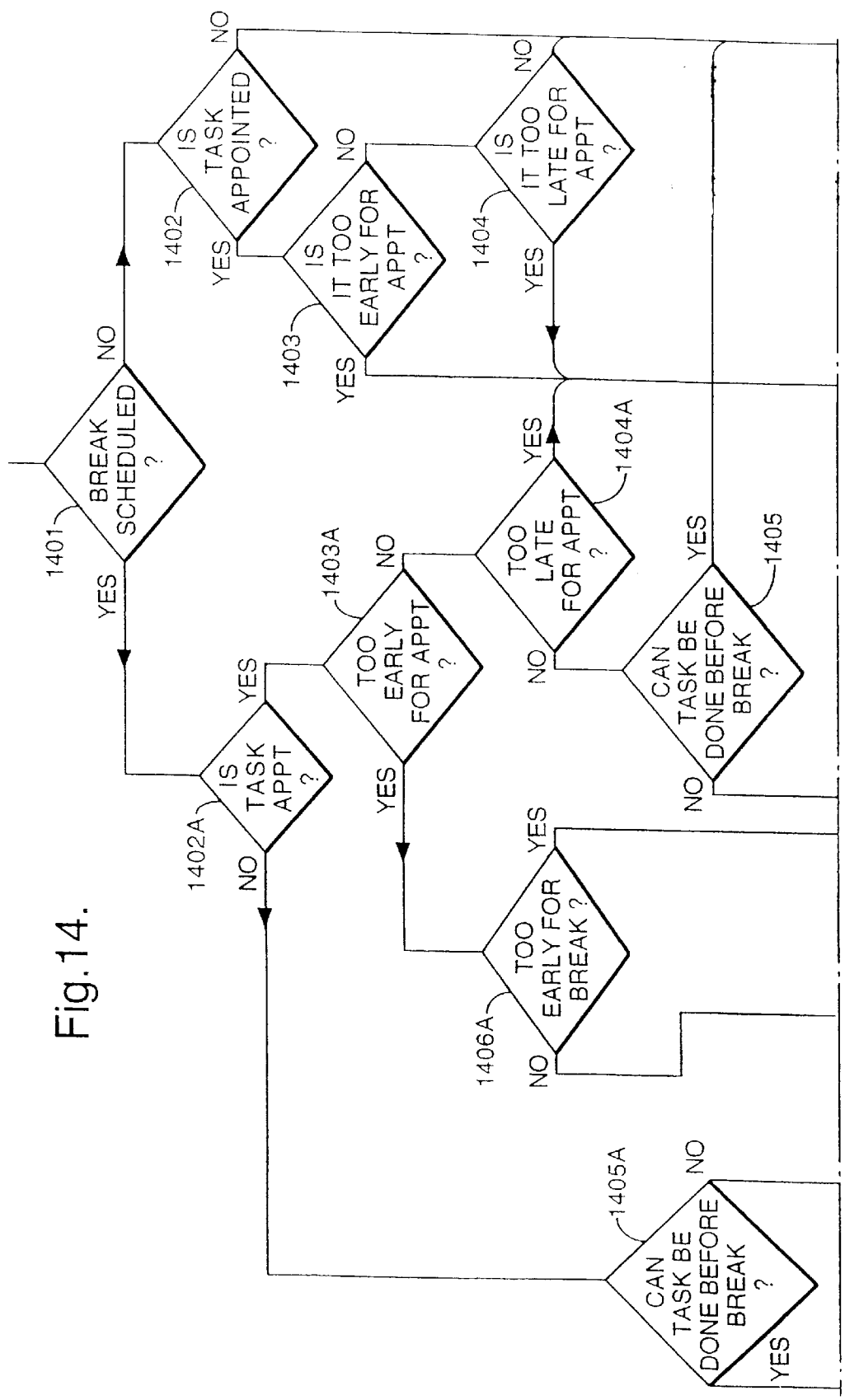
Figure 14:
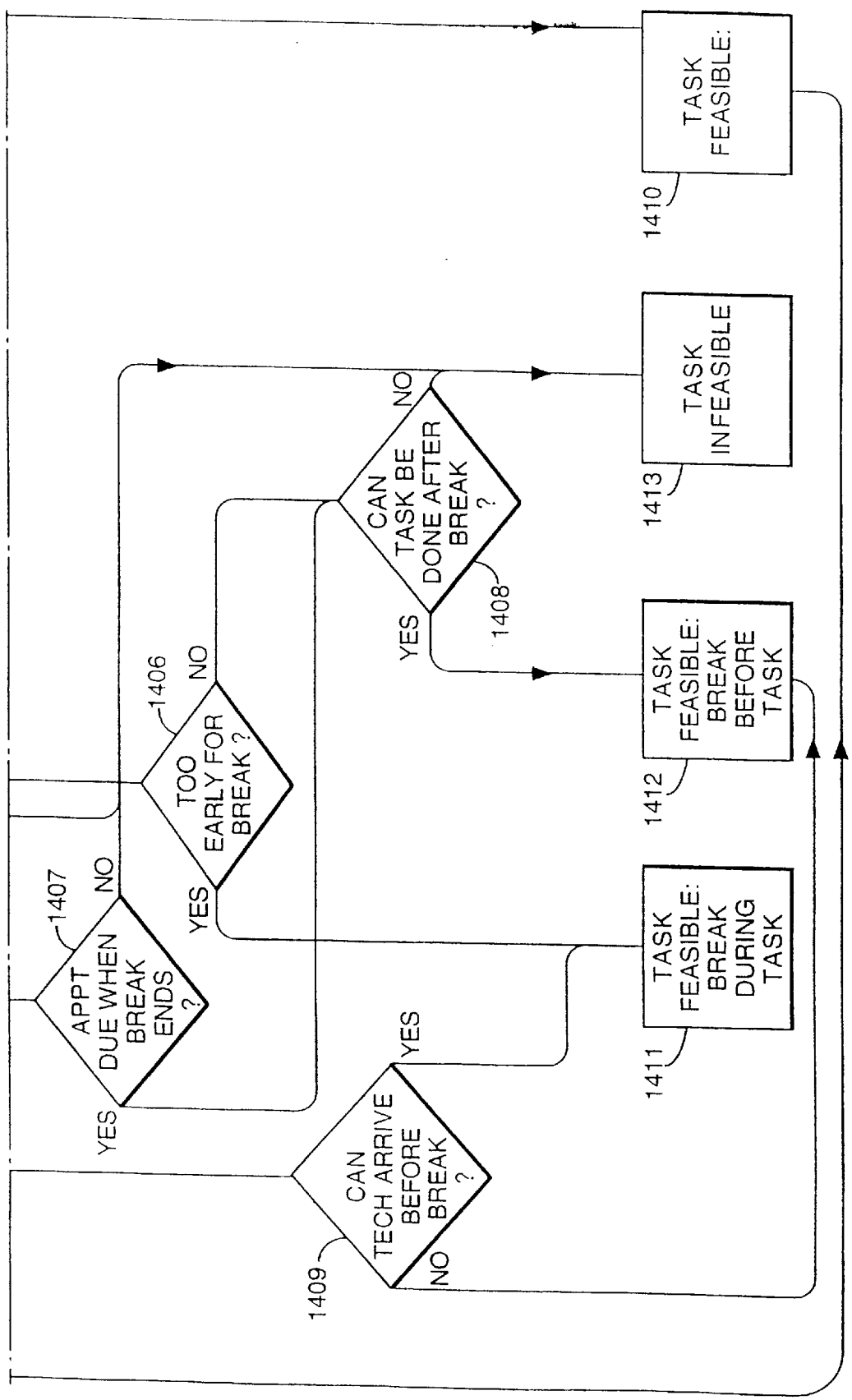

The processes performed by the pre-scheduler 30, optimising subsystem 31, and real-time modifier 40 will now each be described in detail, with reference to FIGS. 5 to 9 (pre-scheduler), FIGS. 10 and 11 (optimising subsystem) and FIGS. 12 to 14 (real-time modifier).

Figure 5:
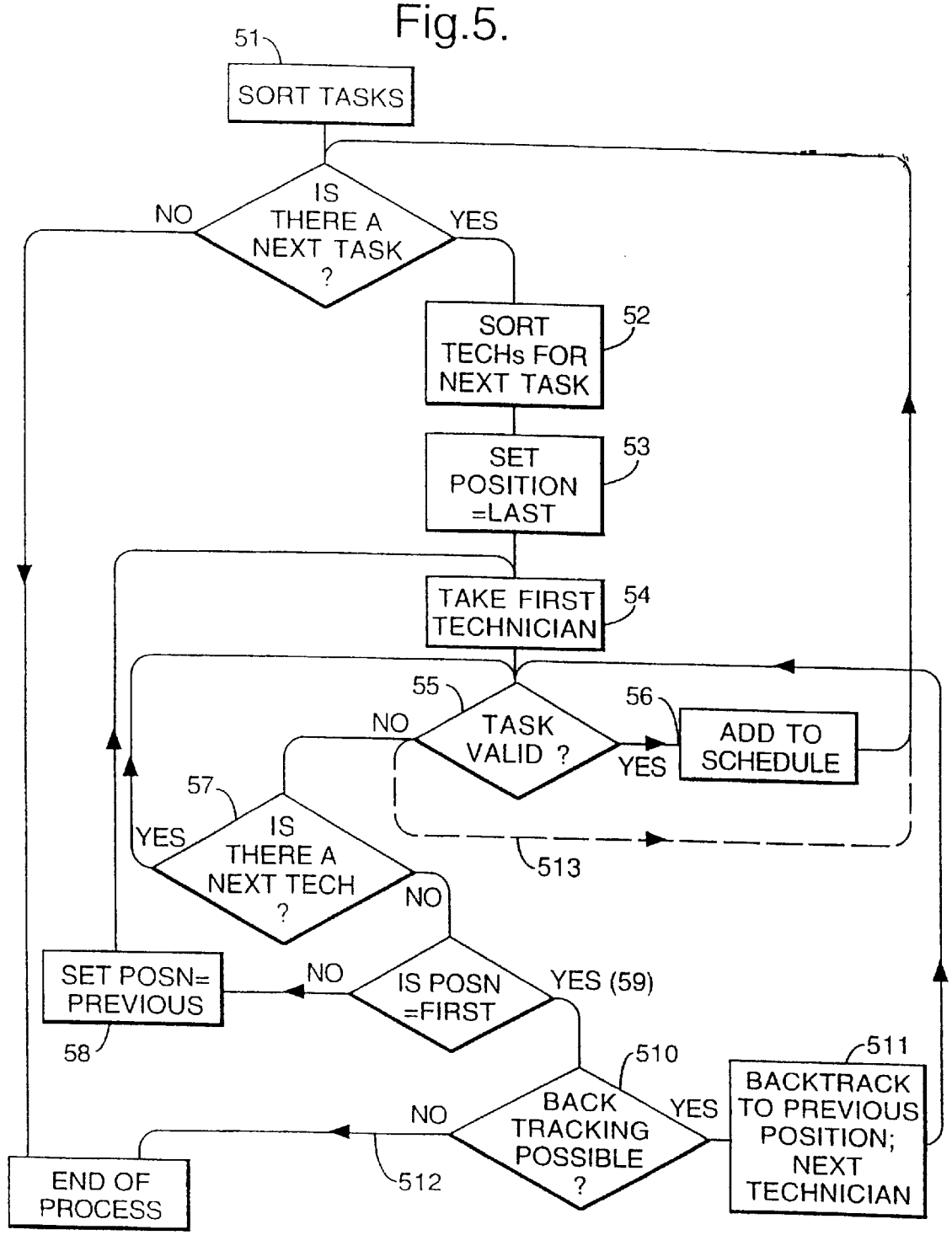
FIG. 5 is a flowchart illustrating the operation of the pre-scheduler 30 of FIG. 3.

The scheduling process performed by the pre-scheduler 30 is illustrated in flow diagram form in FIG. 5. Before allocating the tasks to technicians the pre-processor 34 carries out some pre-processing of the data. This involves working out the earliest and latest that each of the tasks may be started. This information is utilised when attempting to add tasks to tours. The resource pre-processor 33 fixes in the tours the technician's next availability, breaks, absences, and the "end of day" event.

The technician's next availability covers not only the situation when the programme is running for example overnight and the technician has not yet started work for the day, but also the situation whereby the technician is already at work and it is required to estimate the time at which he will finish his current activity (e.g. to complete the task that he/she is on or returns from an authorised absence). In the latter case the pre-scheduler 30 will calculate the time the technician is next available, using information on the expected duration of the current activity, plus an estimate of the traveling time that may be involved. In the start of day case, all technicians will be assumed to start wore at their scheduled time for reporting on duty.

The resource data includes details necessary to schedule breaks, for example for meals. These breaks are normally of specified duration, but their start (and therefore finish) times are flexible within a specified window to suit the requirements of the work, and their locations are not pre-arranged. Details are stored, for each technician, of the earliest that a break may begin, the latest time it may begin, and its duration. The pre-scheduler 30 will, initially, position each break at its earliest possible start time.

The resource data also includes details necessary to schedule absences from duty. These may be to carry out other duties not controlled by the scheduler, such as training, team meetings etc., as well as authorised non-work absences such as medical appointments. These absences normally have fixed start and finish times, and may also have specified start and finish locations. (These locations may be different if the absence involves travel, for example to take equipment for repair, or to collect supplies). Details are stored, for each technician, of the times and locations of any such scheduled absences. Note that because an absence may have a location associated with it, travel to or from it has to be taken into account in scheduling.

The pre-scheduler is also supplied with details of each technician's end of day data (including any scheduled overtime). The pre-processing will place the end of day or "go home" point so that the technician's day ends at the correct time. The basic fixed points in each technician's schedule have now been created.

At any one time there will be a small portion of the total tasks available for allocation that will be more difficult to schedule, and to move within or between the tours, than the majority of tasks. Typically these tasks will be more heavily constrained than the others. The pre-scheduler schedules these tasks, so that there is the maximum amount of flexibility available for the subsequent scheduling steps. A task scheduled by the pre-scheduler will not be moved to another technician as part of the search processing performed by the optimising subsystem.

The input 33 passes details to the pre-scheduler 30 of the tasks that each technician is capable of performing.

The task pre-processor 34 selects the subset of tasks that are to be scheduled by the pre-scheduler 30 (i.e. the list of tasks considered difficult to schedule), and passes these tasks to the pre-scheduler 30. These include:

a. Tasks requiring more than one person at a single location.

b. Tasks requiring more than one person, but at different locations.

c. Tasks that must all be allocated to the same technician in a predetermined order.

d. Tasks having a duration greater than a predetermined value.

e. Tasks that the user has requested to be allocated to a specific technician. This category may include tasks that have been scheduled in a previous run of the scheduler, if the user has decided that they should not be moved to another technician by a subsequent run. For example, if the task requires specialised equipment, this may already have been issued to that technician.

Any tasks not selected for pre-processing are passed directly to the optimising subsystem 31.

The deterministic process carried out by the pre-scheduler 30 is shown in FIG. 5. The selected tasks are first sorted into a priority order (step 51) and then scheduled in that order. The priority order may be selectable by the user, using the rule input 35. A typical sort order would be;

1. earliest start time of tasks (earliest first; those with no scheduled start time or where earliest time has already passed are given the current time)

2. importance score (highest first)—this may be determined according to factors such as the number of customers affected, whether the task is safety-critical, any financial penalties, etc.

3. number of technicians required (highest first)

4. target arrival time (earliest first) i.e. the time by which a task must be started to meet an appointment or service guarantee. This may take estimated task duration into account if the commitment is to complete the task by a given time (i.e. arrival time=completion time−task duration).

5. duration (longest first)
6. number of technicians able to perform the task (smallest number first)

Thus at any time priority will be given to tasks that can be done immediately and, within this category, to the tasks with the greatest importance score.

For each task to be scheduled, the list of technicians who can do the task will be stored into a priority order (step 52). This priority order takes into account factors such as a. whether the technician has the skills required for each task,
b. whether the technician has any security clearances required to gain access,
c. whether the task is in the technician's preferred working area,
d. success/fail (a measure of whether a task, if allocated to the technician as the next task in his tour after all the other tasks currently in his tour, would still meet his primary commitment target. A success is a task that meets its primary commitment; a fail is one that does not).
e. Success margin (a measure of expected arrival time minus target arrival time (for appointments requiring a response before a predetermined deadline), or estimated completion time minus target completion time (for other tasks). Minimising this margin ensures that lower priority tasks yet to be allocated are not excluded because of higher priority tasks being performed earlier than necessary.
f. The number of skills that the technician possesses (lowest first: to ensure that the most versatile technicians are not allocated to a task which a less versatile technician could have done).
g. Travel time (the time that would be incurred by the technician in getting to the task. If the technician already has tasks or activities in his tour then the travel will be from the latest position to the task. If the task is the first of the day then the travel will be measured from the technician's starting location).

The pre-scheduler 30 then attempts to schedule the tasks to the technicians. Firstly it tries to add the first task to the end of each technician's partial tour in turn (step 53) working through the ordered list of technicians starting with the first (step 54). If the position is valid (step 55) then the task is scheduled to that technician (56). The positioning in the technician's tour takes account of the time required to travel between locations. Thus if a technician's existing partial tour ends at time T, the next task allocation is attempted at time T+t, where "t" is the journey time between the two tasks. The value of t will be different for each combination of technician and task.

If the task cannot be added to the end of the first technician's tour, the process is repeated for other technicians (step 57). If the task cannot be added to the end of any technician's tour then the penultimate position (i.e. immediately before the last task already in the schedule) is tried, for each technician in turn (step 58). Again, if a valid position is found, the task is scheduled. This process continues until either the task is scheduled (step 56) or until every position in each technician's tour has been tried, and no valid position has been found.

If this latter situation occurs (step 59) the pre-scheduler back-tracks (step 510), by attempting to reschedule the last task added to the schedule, by deleting it from its current position and continuing the search from that point until another valid position is found, using the same rules as before. The search then continues, with back tracking where necessary, until the task is scheduled (step 56). This process is then repeated until either all tasks are scheduled, or it becomes impossible to schedule the next task, (step 512) or until a predetermined runtime is exceeded.

When it becomes impossible to schedule the next task, the output from the pre-scheduler 30 is the tour created up to that point which schedules the most tasks. Note that this tour is not necessarily the final one to have been created, as backtracking may have deallocated more tours than it allowed to be allocated.

If run time is limited the scheduler may be arranged to make only a single attempt to schedule each task, using the most preferred technician for that task, as illustrated by the dotted line (513) in FIG. 5.

In the case of a task that requires more than one person, (which is treated as a group of linked tasks for the purposes of this process), the scheduling of the tasks is done such that their start times are aligned. In some cases this may result in a technician having idle time.

The pre-scheduler uses overtime as appropriate within limits determined by each technician's individual overtime limit. These limits are input to the pre-scheduler at input 33 and includes scheduled overtime, planned flexitime and other permitted variations in working hours. If a task may be completed within an individual's permitted overtime then it may be scheduled by the pre-scheduler. However if a task ,could overrun an individual's overtime limit then it is only scheduled if the task can be split, with the proportion of the task that can be completed before the end of the overtime day being greater than a predetermined minimum. In these circumstances the first part of the task is scheduled to be completed at the scheduled end of day.

The end of day marker for each technician, which has been positioned by the pre-processing, is moved if a task is scheduled that will incur unscheduled overtime. The new position for the end of day marker will be the later of the time the technician completes the task which includes unscheduled overtime, and the time the technician would report off-duty.

It is possible that absences would involve the technician in travel (e.g. travel to and from a team meeting). Such travel is taken into account when determining the technician's expected arrival time for a task, and his expected completion of a task.

The pre-scheduler 30 described above is only used for scheduling the most difficult-to-place tasks. If the pre-scheduling function were used to schedule the entire work programme the run time required would make the schedule unusable by the time it was produced, because of new inputs made to the system during the run time. It is not efficient to devote excessive computer processing time to produce a perfect solution when that solution is likely to be modified as a result of real-time circumstances. For tasks which are easier to schedule, there are likely to be many acceptable, albeit non-optimal, solutions, and it is preferable to obtain a near-optimal solution in a limited time, rather than to produce the perfect solution in a very much longer time. A number of stochastic techniques are known in the art for generating near-optimal solutions to multi-dimensional problems such as the one specified here. Several of these are discussed in the article "Stochastic Techniques for Resource Management" by Brind, Muller & Prosser in the BT Technology Journal Volume 13 No. 1 (January 1995). In particular, this article describes the techniques known as "Hill Climbing", "Simulated Annealing", "Tabu Search" and "Genetic Algorithms".

In Hill Climbing a random solution to the problem is selected, then "neighboring" solutions which differ in small ways from the original solution are assessed, and the neighbour with the optimum value is selected. This process is continued as many times as required. A problem with hill climbing solutions is that the process can become "trapped" in a local optimum of the solution space.

Simulated Annealing operates in a similar way to Hill Climbing except that it also allows some moves to less optimum solutions. The ability to do this is arranged to reduce as the process proceeds, such that the process can escape from a local optimum, but is less likely to return to it.

The Tabu Search process compares the value at a randomly selected starting point, with several possible solutions from the neighbourhood of the starting point. The point with the optimum value (which may be the starting point) is then selected, and the process is repeated using this optimum point as the new starting point. The arrangement is such that a solution which has already been rejected is excluded from consideration on subsequent cycles. As the local solution space becomes searched-through, the system necessarily looks further afield for possible solutions until eventually a more optimal solution is found. The process will therefore eventually escape any local minimum in the solution space.

Genetic Algorithms attempt combinations of the optimum solutions so far found, in an attempt to identify a solution which is superior to either of its individual "parent" solutions.

Systematic techniques may also be used. These explore every possible permutation of tasks, (although groups of permutations may be eliminated collectively) and so will be certain to find the optimum solution. However, in a limited time a stochastic technique will generally find a near-optimal solution in a much shorter time..

As is discussed in the article referred to, the choice of which technique is best suited ton a particular circumstance depends on the nature of the problem. For speed of operation and robustness on both under- and over-resourced problems, the Simulated Annealing technique is preferred for use in the present embodiment of this invention, but it is to be understood that alternative optimisation techniques are not excluded from the scope of the claims.

The optimisation subsystem 31 of the present embodiment will now be described. As shown in FIG. 3, the optimising subsystem 31 has three inputs. Firstly, there is an input for a set of tours for the technicians that are available, produced by the deterministic pre-scheduler 30. (In an alternative arrangement, the deterministic pre-scheduler 30 may be omitted and the tours include only fixed points set by the pre-processor 33). This input, may also be used for tours generated by the post-optimiser 39 in an iterative arrangement. Secondly, there is an input for the details of the available technicians, 37. Thirdly, there is an input for the details of the unscheduled tasks 38 (i.e. those not selected by the pre-scheduler processor 34 for scheduling by the pre-processor 30).

Before starting work the optimising subsystem 31 carries out some pre-processing of the data. This involves working out the earliest and latest that a task may be started. This information is utilised by the optimising subsystem when attempting to add to tours. In addition the pre-processing fixes the activities, breaks, absences and the end of day event in each tour. The optimising subsystem requires various parameter values, programmed by an input 36.

The function of the optimising subsystem 31 is to produce a set of tours for the technicians which minimises the objective cost function. The final tours are produced by making one change at a time to the current schedule, using a single modifying operator. The optimising subsystem passes the details of the tours produced to a store 32, from where they can be retrieved by the real-time modifying system 40.

Note that none of the tasks scheduled by the pre-scheduler 30 can be moved by the optimising subsystem 31 to another technician or to the unscheduled state (dummy technician). However the optimising subsystem 31 will be able to move these tasks within their time windows and insert tasks before, between and after them. It is possible that the final tour produced by the optimising subsystem has tasks, originally positioned by the pre-scheduler, in an amended order (e.g. if the pre-scheduler 30 orders two tasks so that task A is followed by task B, it is possible that the optimising subsystem 31 may insert other tasks between them, which may result in retiming of one or both of the tasks, provided that the various constraints on both tasks are still complied with, and their order is preserved.

The detail of the "Simulated Annealing" methodology will now be explained. There are four elements to this methodology:

objective function modify operator cooling regime; and stopping rule.

Each of these four elements will now be described, beginning with the objective function. This provides an objective assessment of which of two solutions to the problem being addressed is better, and whether a move being considered improves the solution or makes it worse. The function is summed across all tasks in the system, whether these tasks are scheduled or not, and irrespective of whether the pre-scheduler or the simulated annealer positioned the task in the tour. The objective function can be thought of as being made up of four components. These components are:

a travel penalty;

an overtime penalty;

a skill bias penalty;

the cost of allocation—i.e. a measure of the risk and cost of failure, or a contingency value.

These four components apply to all tasks except low priority "infill" tasks, which are treated as a special case and receive a cost proportional to the amount of travel involved only.

The travel penalty is determined by multiplying together a cost per unit time, and the estimated travel time. Thus the longer the estimated travel time that is involved in an allocation, the higher the cost.

The overtime penalty works in an identical fashion: the cost of each minute of overtime is multiplied by the amount of overtime used. Again, the more overtime used is, the higher will be the cost of allocation.

The skill bias penalty adds additional cost to the objective function if the skill needed by the technician for the task is not a skill that the user wishes to bias the scheduling towards (typically a rare skill, such that if possible those technicians qualified in it are preferably not allocated to tasks which do not require it).

Taken together these three costs have the effect of ensuring hat the simulated annealer tries to minimise travel, allocations which do not reflect the required skill bias, and overtime.

The cost of allocation is a function of the type of task, importance cost of the task, and whether the task is positioned so that it meets a defined deadline. In general this takes the form of reducing the cost of allocation the earlier the task is completed. This is calculated, for tasks where there is a target arrival time, as the difference between the expected arrival time and the target arrival time, and for tasks where there is a target completion time as the difference between the estimated completion time and the target completion time.

These terms are modified to give the function two important further properties as follows. Firstly, a property "P" is defined as the ratio of the difference between the expected time of meeting the target and the target itself, and the maximum time that the expected time may exceed the target. For example a task with an appointment to be made in the period from 10.30 am to 1 pm, where the expected arrival time is 11.30 am has a value of P which is 11.30 am minus 1 pm (90 minutes) divided by 10.30 am minus 1 pm (i.e. 150 minutes) equals 90/150=0.6, as does a task that has to be completed by 5 pm and which is expected, at 12 noon, to be actually completed by 2 pm. In both cases the target is met 40% of the way into the available window and the only difference is the cost of allocating, dependent only on the importance cost of allocating each task.

Secondly, the cost of delaying a task positioned near to the point at which it is going to fail should be greater than the cost of bringing forward, by the same amount of time, a similar task which is still a long way from the time at which it will fail. For example if there are two tasks with a commitment time of 5 pm, where one was expected to be completed at 4.50 p.m. and the other at 12.00 noon, then a move which resulted in the first being brought forward by five minutes while the second is delayed by five minutes reduces the total scheduling cost. Thus moves that delay a task already close to failing will only improve the objective function if the delay allows a very much larger benefit elsewhere.

The only difference between the cost of allocating the different tasks at the start of their respective windows is due to any differences there may be in the importance scores of the tasks. This means that the relative importance of the two tasks, as indicated by the importance scores, is not distorted.

To reproduce this second property in the objective function, the term $(1+P/2) \times P$ is introduced into the costs for all tasks that meet their primary commitment target. This term means that the cost of allocation increases as the task nears its primary target time; at first it increases by a little for each minute's delay, but as the target approaches this rate increases. When cost is plotted against the difference between expected time and target time, a curve results, as is illustrated in the examples shown in FIGS. 6 to 9, to be described later.

Some tasks have to be done at a fixed appointment time e.g. agreed with a customer. Others have a target response time. For tasks which do not have an appointment time the cost of allocation is further increased if a task is positioned in a tour in a position where it would fail its primary commitment target, (i.e. the guaranteed response time). There may also be a secondary commitment target, beyond which compensation payments are payable to the customer. The fixed cost penalties are designed to ensure that the number of tasks which fails these is minimised. Without these costs the cost of allocating two identical non-appointment tasks, one failing its target by one hour and the other meeting it with two hours to spare, would be better than succeeding on both tasks each by 15 minutes. The latter is obviously preferable in business terms. With fixed penalties the cost may be adjusted so that the desired business solution is the one with the lowest cost.

For appointments that are left unscheduled at the end of the tour building process the cost of allocation is determined by a fixed cost, weighted by an importance cost of allocation. Non-appointed tasks that are left unscheduled are costed on the basis of an assumed completion time at the end of the scheduling period, plus the task duration. This costing is designed to ensure that the cost of adding a task to a schedule is always less than the cost of leaving it unscheduled.

The importance cost of allocating a task is based on an importance score (IMP) modified by two parameters: importance score multiplier (IMU), and importance score index (IEX). It is calculated as $IMU^{IEX} \times IMP$. If IMU and IEX are both set to 1 (or IEX=0) then the cost is simply the importance score of the task. Values of IMU and IEX greater than 1 increase the differential cost of allocating tasks with a high importance score compared to a low score.

Infill tasks are costed in the objective function, using a cost of zero for each task scheduled and a cost of 1 for each task unscheduled. Thus role is designed to ensure that it will always be cheaper to schedule an infill task rather than to leave it unscheduled, but it will never be worth delaying a more important task to enable an infill task to be scheduled.

The objective function uses the following parameters:

ETT (Estimated travel time in minutes; generally the time estimated for the technician to travel from one task to the next).

FTF (Failed Task Flag:=1 if task fails its commitment target, 0 otherwise)

FSP (Failed secondary commitment penalty)

SCT (Secondary commitment time: a time, later than the target completion time, at which the cost penalty has a step change)

TSS (Time at which the run of the search system starts.)

ETA (Estimated time of arrival) this is calculated as the time the technician will arrive on site assuming that all travel and task durations are exact and that each task is scheduled as soon as the previous task finishes. However, if this calculation causes the task to occur before the start of the allocated time window, ETA is calculated as the exact start of the task's task window. A task's time window is defined as the time between the task's earliest start time (EST) and latest start time (LST).

TAT (Target arrival time; given by the task pre-processor 34. For an appointed task this will be the end of the appointment slot)

UOT (Amount of unscheduled overtime in minutes: the amount of time beyond the technician's scheduled end of day required to perform the scheduled).

ETC (Estimated time of completion: the time at which the technician is expected to complete the task. For scheduled tasks it is calculated as ETA plus the duration of the task itself. For unscheduled tasks it is calculated as scheduled end time plus the duration of the task. The value is specific to the technician, because technicians have different rates of working, specified in the technician pre-processor 33)

TCT (Target completion time: a field provided for tasks which do not have an appointment time. Failure to meet the target completion time incurs a cost penalty but does not fail the task).

FSF (Failed secondary commitment flag: set to 1 if the task fails its secondary commitment target, or zero otherwise.)

SBF (Skill bias penalty flag: set to the value of the technician's skill preference for the scheduled task, minus 1. For example if a task requiring a specified skill is allocated to a technician who has a preference for that skill of 3, the SBF is set at 2).

BTF (Business time flag: set at 1 if the expected arrival time of the technician is before an early cut-off time or after a late cut-off time, i.e. outside the window for such a task to be performed, or zero otherwise. The expected arrival time is determined as the time the technician arrives on site, assuming that all travel and task durations are exact and that the tasks are allocated as soon as the previous task finishes or, if this moves the task out of its time window, at a time such that technician arrives at the start of the task time window)

ETP (Estimated travel penalty: this parameter takes a value greater than or equal to zero, and is used to work out the contribution to the objective function for the travel associated with each task. The travel contribution is determined as ETP multiplied by ETT. The default value of the parameter is zero.)

OTP (Unscheduled overtime penalty: this parameter takes a value greater than or equal to zero, and is used to work out the contribution to the objective function that each task allocation incurring unscheduled overtime will make. The default value is zero).

UAP (Unallocated appointment penalty: this parameter takes a value greater than or equal to zero, and is used in working out the contribution to the objective function for appointments which are not allocated. The default is again zero).

FTP (Failed task penalty: takes a value greater than or equal to zero, and represents the amount that will be used in working out the contribution to the objective function for non-appointment tasks. Default is zero)

SBP (Skill bias penalty: takes a value greater than or equal to zero, and represents the amount to be added to the objective function for each task allocation that does not reflect the desired skill bias; i.e. if the skill bias flag (SBF) is set to 1. The default value of the parameter is zero).

ATC (Arrival type constant: an integer greater than zero: this represents the period of time over which the cost of allocating a failed "arrival-type" task—i.e. one where the commitment is to arrive at site at a given time, as distinct from one where the commitment is to complete the task—doubles)

ITP (Infill task travel penalty: takes a value greater than or equal to zero and represents an amount which will be used to work out the contribution to the objective function for the travel associated with each infill task allocated. The travel contribution is calculated as ITP multiplied by ETT (estimated travel time). The default value of the parameter is zero.)

MIT (Maximum infill travel: takes a value greater than or equal to zero, and represents the amount of travel beyond which the cost of allocating an infill task exactly equals the cost of not allocating it. The higher the value, the further a technician might be allowed to travel to such an infill task.)

BTP (Business time penalty: takes a value greater than or equal to zero, and represents an amount that will be used to work out the contribution to the objective function for the allocation of a non-appointed task Where the estimated arrival time on site of the technician is not within a specified period. An allocation that incurs this penalty is identified as any that has the business time flag (BTF) set to 1. The default value of the parameter is zero.)

Note that all times are in minutes, clock times being set at zero =midnight; e.g. 12 noon on Day 1 is represented as 720; 4.40 p.m. as 1000; 9:20 a.m. on day 2 as 2000, etc. Time outside the normal working day is not removed. For the sake of example, in this case the working day is defined as 8 am to 5 pm, Monday to Saturday). A task with a TAT (target arrival time) of 5 pm on Wednesday and an ETA (estimated arrival time) of 8.01 am on Thursday results in a late arrival of ETA−TAT=901 minutes, not 1 minute. A task with ETA (estimated arrival time) after 5 pm would be assumed, with non-working hours removed, to be completed at 8 am on the next working day; in the present system no such assumption is made. For example a task with an ETA (estimated arrival time) of 5.17 pm on a Saturday (a working day) and a TAT (target arrival time) of 8.12 on Monday would, with dead time removed, result in ETA−TAT=−12 (i.e. only just completed in time); instead of the correct value of−2335.

The objective function to be minimised is determined by the following ten equations, depending on the type of task involved.

Equation 1: For allocated appointed tasks the contribution to the objective function is:

$$(1+P/2) \times P \times (IMU^{IEX} \times IMP) + (ETP \times ETT) + (OTP \times UOT) + (SBP \times SBF)$$

where, if the current time is equal to or has passed the slot opening time:

$$P=(ETA-TAT)/(TAT-TSS) [\text{if } TAT=TSS \text{ then } P=0]$$

or, if the slot has not yet opened:

$$P=\min\{1,(ETA-TAT)/\text{length of the appointment slot in minutes}\}$$

Equation 2: For allocated arrival type tasks where ETA minus TAT is less than or equal to zero, the contribution to the objective function is:

$$(1+P/2) \times P \times (IMU^{IEX} \times IMP) + (ETP \times ETT) + (OTP \times UOT) + (SBP \times SBF)$$

where $P=(ETA-TAT)/(TAT-TSS)$ [if TAT=TSS then P=0]

Equation 3: For allocated arrival type tasks, where ETA−TAT is greater than zero, the contribution to the objective function is:

$$(P+FTP) \times (IMU^{IEX} \times IMP) + (ETP \times ETT) + (OTP \times UOT) + (SBP \times SBF)$$

where $P=(ETA-TAT)/ATC$

Equation 4: For deallocated appointments and arrival-type tasks the contribution is:

$$(IMU^{IEX} \times IMP) \times UAP$$

Equation 5: For allocated commitment tasks where ETC−TCT is less than or equal to zero the contribution is:

$$(1+P/2) \times P \times (IMU^{IEX} \times IMP) + (ETP \times ETT) + (OTP \times UOT) + (SBP \times SBF) + (BTP \times BTF)$$

where $P=(ETC-TCT)/(TCT-TSS)$

Equation 6: For allocation commitment tasks where ETC−TCT is greater than zero, but the secondary commitment limit is not exceeded, the contribution is:

$$(P+FTP) \times (IMU^{IEX} \times IMP) + (ETP \times ETT) + (OTP \times UOT) + (SBP \times SBF) + (BTP \times BTF)$$

where P=(ETC−TCT)/(SCT−TCT)

Equation 7: For allocated commitment tasks where ETC−TCT is greater than zero and the secondary commitment limit is exceeded, the contribution is:

(P+FSP+FTP)×(IMU$^{IEX}$×IMP)+(ETP×ETT)+(OTP×UOT)+(SBP×SBF)+(BTP×BTF)

where P=(ETC−TCT)/(SCT−TCT)

Equation 8: For unallocated commitment tasks the contribution is to be:

{(ETC−TCT)/(SCT−TCT)+(FTP×FTF)+(FSP×FSF)}×(IMU$^{IEX}$×IMP)

Equation 9: For allocated in-fill tasks the contribution is:

ETT×ITP

Equation 10: For unallocated in-fill tasks the contribution is:

MIT×ITP

Note that no appointment will be scheduled that is expected to fail (i.e. the technician arrives on site after the end of the appointment slot). In addition if an appointment is scheduled for a time when the technician could arrive before the appointment slot opens then it is assumed that the technician will instead arrive at the moment that the slot actually opens.

The cost of allocation is illustrated, for a number of different types of tasks and situation, in FIGS. 6 to 9. These show how the cost of allocating a task varies as the arrival time or completion time of a task changes. In all cases IEX and IMU are set at 1.

Figure 6:
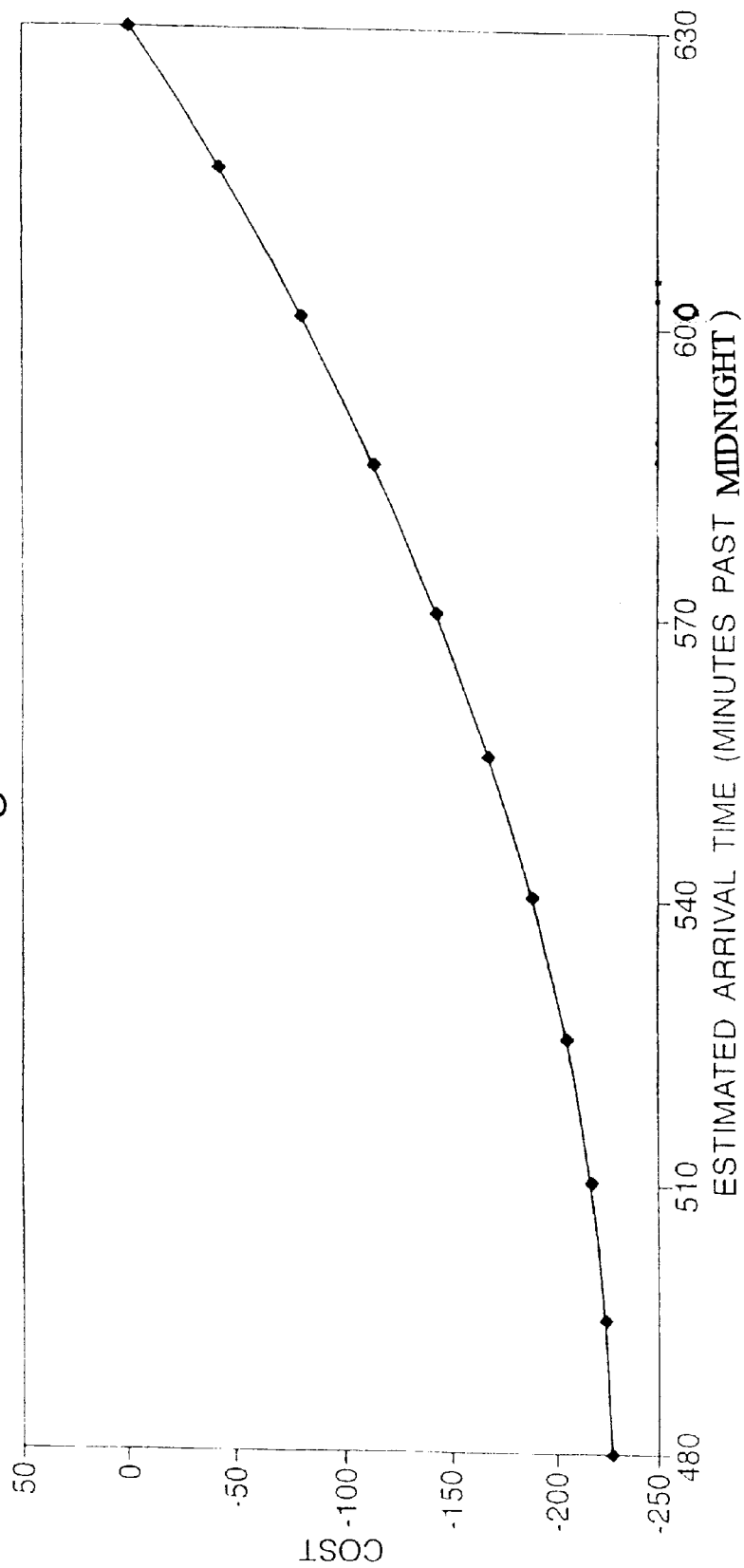
FIGS. 6, 7, 8 and 9 illustrate the variation with time of the cost of allocation of a task with time, for five different situations.

FIG. 6 illustrates the situation for a task appointed to a specified "timeslot". This task is appointed for the period between 8 am and 10.30 am (480 to 630 minutes after midnight) and therefore the only valid times of arrival are in this range. To arrive exactly at 8 am would produce a cost of minus 0.5 times the importance score of the task, whereas to arrive at exactly 10.30 am would get a score of zero. If the task were to remain unallocated, and therefore not performed, a penalty score of UAP×IMP is incurred. UAP is set to a positive value, so the cost of allocating an appointment is always less than the cost of not allocating it.

Figure 7:
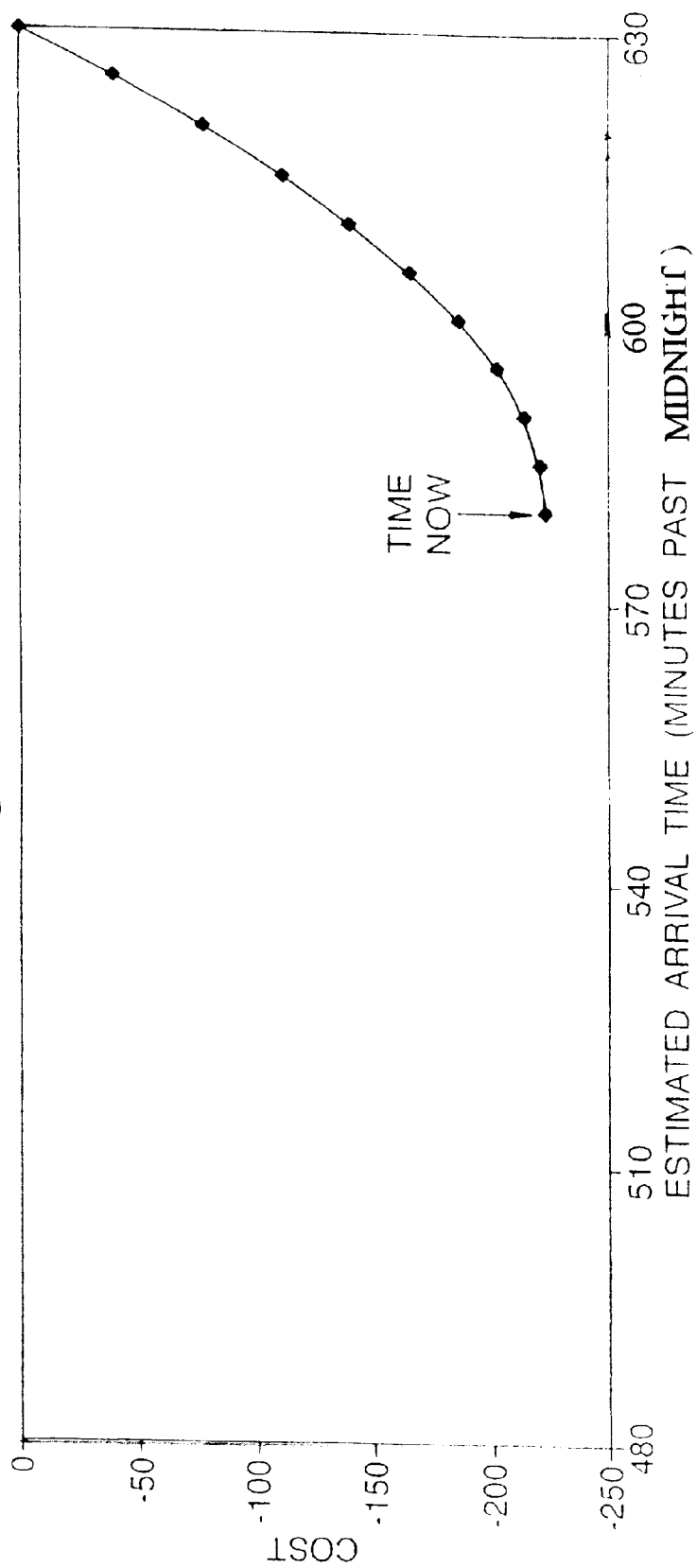

FIG. 7 shows a similar situation to that of FIG. 6, except that the slot has already opened and the current time is 9.40 am (580 minutes past midnight) so there are only 50 minutes remaining before the slot closes. The shape of the curve is the same, but the values of the time axis have been compressed.

FIG. 8 shows a task without an appointment time, but with a commitment to complete by a specified time (5.30 p.m: 1050 minutes). The parameter FTP is set to 1 resulting in a step change in cost beyond the commitment target, the size of the step being equal to the importance score (i.e. 50). The parameter FSP is set to 2, resulting in a further step change in cost of twice the importance score (i.e. 100) beyond a secondary commitment time (in this case the penalty time; 2040 minutes i.e. 10 a.m. on Day 2).

FIG. 9 shows how the cost of allocation varies with time for a task with a target arrival time with an importance score of 900. In this figure the target arrival time is 12 noon (720 minutes) and the value of the parameter FTP is 0.1. This results in a step change of 90 (i.e. 0.1 times the importance score of 900) when the task passes 12 noon.

An initial schedule is built up by taking the partial schedule generated by the pre-scheduler 30 and arbitrarily allocating further tasks to technicians. This initial schedule is then modified by the optimising subsystem 31. This process is illustrated in the flow chart of FIG. 10. The process includes four steps 1001, 1002, 1005, 1016 which require the generation of a random number. The tasks and technicians are each allocated a number.

The process starts by costing the original schedule (step 1000). Next, a random number generator is used to select one of the tasks. With the exception of the pre-allocated tasks, already discussed, each task has the same probability of being selected, whether it is currently in a schedule or not. How the process continues, once a task has been selected, depends on whether the task selected is already in a tour.

A feasible technician (i.e. one who can do the task as determined by the pre-processor 33) is also selected at random (using an analogous process to that used for selecting a task). The number is selected (step 1002) from the range 1 to N+1, where N is the number of feasible technicians: however the number which corresponds to the technician to whom the selected task is currently scheduled is excluded from selection. The number N+1 represents a "dummy" technician. Allocating a task to the dummy technician constitutes deallocating the task for the purposes of the objective function. Note that the chance of scheduling a task to the dummy technician is 1/N, and therefore diminishes as the number of technicians in the system increases. If the task is not already scheduled, then it is the dummy technician who is excluded from selection.

If the task is not for the dummy technician (step 1003), and not for an appointed time (step 1004), a random position in the tour of the selected technician is selected (again using the random number process; step 1005) and the position is examined to see if the task can be fitted into it (1006). For it to be possible to fit the task into the tour the gap must be big enough to include the task or, if not, it must be possible to delay all the subsequent tasks in order to create a gap large enough to insert the task (1007).

If the task has an appointment time (step 1004) then all the possible positions in the tour are examined (steps 1008 to 1010) until a valid position is found (step 1009). The validity of each position is determined (step 1009) by reference to the appointment slot of the task; for example a task appointed to an afternoon slot is not valid for a position in the tour which finishes at 9.30 am. If all positions have been tried and none are valid (step 1010), the task is rejected (step 1018) and a new one selected (step 1001). If a valid position is found it is examined as described above for non-appointment tasks to determine if the task may be fitted into it (steps 1006 & 1007). Note that a task having an appointment time will not be scheduled to a position where the technician would arrive outside a time window defined by the appointment slot start time (minus an allowed margin), and the appointment end time. If the estimated completion of the previous task would allow the technician to arrive before this window then it is assumed that the technician will incur idle time. Travel to and from a task inserted into a schedule is allowed for in determining whether the insertion may be made.

If insertion is possible (step 1006), the task is inserted into the technician's schedule (step 1012) and the revised schedule costed (step 1013). The cost of the revised schedule is then compared with the best existing value (step 1014). Any move that decreases the objective function, or keeps it unchanged, is automatically accepted (step 1015). This is similar to the process referred to previously as "Hill Climbing", because only moves in a particular direction (towards optimum) are accepted. However in a Simulated Annealing process, moves which increase the value of the objective function are also accepted, with a probability p defined by the "cooling regime", to be described shortly. A random number R in the range zero to 1 is generated (step 1016) and if it is less than or equal to the probability p (step 1017) then the move is accepted (step 1015).

If the move is accepted, the resulting value of the objective function is compared to the best value obtained previously (step 1019). If it is better than the previous best, the solution is saved as the new "best value" (step 1020) for future comparisons. Any change may be rejected (step 1018) either at this final stage, or because the task cannot be inserted into the schedule (step 1007 or 1009).

The process is then repeated for another task (step 1001) using either the revised schedule if the change was accepted (step 1015), or the previous schedule if the change was rejected (step 1018). Note that a move which is accepted in step 1015 is used as the basis for the next iteration, whether or not it is an improvement on the "best value" (steps 1019/1020).

Deallocating a task (i.e. scheduling it to the dummy technician) will always increase the objective function, but such deallocations are accepted with probability p, thereby allowing the possibility, in the next iteration of the process, to reschedule a replacement task to the technician from whom the task was taken. Note that there are no skill, time, or other constraints on allocating a task to the dummy technician—such an allocation is always feasible, but always increases the objective function.

The probability p of accepting a move that makes the value of the objective function increase is given by the formula $p=e^{(-delta/temperature)}$ The "temperature" is a concept which controls the number of moves that are made that increase the value of the objective function. The higher the value of temperature the more moves will be accepted that increase the value of the objective function. During the search the value of temperature is gradually reduced, so that at later points of the search fewer such moves are accepted. Delta is the difference between the value of the objective function after the change and the value before the change. After a given number of moves at a given temperature the value is reduced. The reduction is produced by multiplying the temperature by a predetermined value. All moves, whether they be valid or invalid, rejected or accepted, are included in this count.

The relationship between delta, temperature and the probability of accepting a move that makes the value of the objective function worse (i.e. greater) is illustrated in Figure 11. This figure shows the two key features of the cooling regime; firstly that the probability of accepting a move that makes the value of the objective function worse decreases as the magnitude of delta increases, and secondly that as the temperature decreases so does the probability.

The simulated annealer can be set to stop either after a predetermined time or after a predetermined number of temperatures have been used. The schedule (a set of tours) that is to be passed to the schedule manager is the one that produces the lowest value of the objective function (i.e. the one that has been stored as the best found so far; step 1020) at the time that the process stopped.

The optimising subsystem 31 uses overtime as appropriate within limits determined by the availability of individual overtime limits; these limits are passed to the subsystem 31 by the pre-processor 33. If a task may be completed within an individual's permitted overtime then it may be scheduled by the optimising subsystem. However if a task would overrun an individual's overtime limit then it is only scheduled if it can be split into two or more sub-tasks, and if the proportion of the task that can be completed before the scheduled end of day is greater than a predetermined minimum. In these circumstances the task is split such that the first part of the task is scheduled to be completed at the scheduled end of day. No split task is positioned such that it is expected to require unscheduled overtime.

During the course of a day the optimising sub-system 31 is run at regular intervals. On each occasion that it runs, the system may start from scratch to attempt to schedule all tasks that have not been scheduled by the pre-scheduler 30. Alternatively, the sub-system 31 may be run by reusing, as a starting point, the tours generated on its previous run. In this mode the optimising sub-system 31 constructs its starting position as follows. For each technician in the previous set of tours a check is made to see if he is still available (i.e. is still on the list of technicians supplied by the technician pre-processor 33). For those technicians who are still available, any tasks positioned by the pre-scheduler 30 are written into the tour. Previous tours are then examined, in the order in which the tasks were to be carried out, and all tasks that may be added to the current tour (i.e. are still valid allocations) are added to the end of the new tour (i.e. after any tasks positioned by the pre-scheduler). Any task no longer valid (e.g. already allocated elsewhere) is omitted from the new tour. Having produced an initial tour in this manner the optimising subsystem then searches for better solutions in the manner already described.

Periodically, the process may be halted and the best schedule identified up to that point analysed by a post-optimiser 39. This uses a rule-based approach to identify individual schedules which appear to be close to optimal, such as schedules having only small amounts of idle time or travel time, and which do not involve an itinerary requiring doubling-back. Such schedules are identified as fixed, and the optimisation process resumed. This ensures that the optimisation process concentrates on those parts of the overall schedule in which improvements are most likely to be found, by constraining its search to those areas of the "solution space".

After a suitable run-time, a final set of technician schedules is produced. This is then passed to the real-time schedule modifier 40. Whilst the real-time modifier is running, using this schedule, the schedule generator 30,31 can resume operation in order to generate a new schedule using updated data.

The operation of the real-time modifier 40 (FIG. 4) is shown in flow chart form in FIGS. 12, 13 and 14. FIG. 4 shows in block diagram form the principal features of the real-time modifier 40. A schedule status register 42 stores the current status of the schedules, which are initially supplied, via the schedule store 32, from the optimising subsystem 31 (see FIG. 3). A technician status register 43 and pool of work register 44 similarly store data relating to the technicians and tasks respectively, initially obtained from the respective pre-processors 33, 34. These three registers are all updatable, as will be explained. A parameter input 41 allows an operator to set the various weightings and other values used by the system.

The technician status register 43 is updatable by inputs from the technicians T1, etc themselves, in particular to record a technician's status as on-line or off-line. The pool of work register is also updatable by means of a manual interface (a computer terminal) 45, which allows an operator to add new tasks to the pool of work during a run of the real-time allocator, e.g. in response to a customer reporting a fault. Automatic inputs, connected to fault monitors within the network 46, may also be provided.

The registers 42, 43, 44 all provide inputs to an allocation processor 47, which uses the current status information in the registers in a manner to be described with reference to FIGS. 12, 13 and 14 to generate an allocation for a technician T when he comes on-line to request instructions. The resulting allocation is passed to an instruction generation unit 48, which transmits instructions relating to the newly allocated task, and any associated activities, to the technician T. The allocation processor 47 also transmits updating information to the technician status register 43, relating to the technician's current location, next expected call-in time, etc. The allocation processor 47 also transmits updating information to the pool of work register 44, in particular to delete the task which has just been allocated. The allocation processor also transmits updating information to the schedule status register, in particular to modify the provisional schedules of any other technicians affected by the allocation just made.

The modifier 40 is managed in such a way that changes which have come about since the schedules were generated can be taken into account at the earliest or most opportune moment. Such changes may be caused by technicians reporting in for new tasks earlier or later than expected, absences requested at short notice, changes to a scheduled task (e.g. an amended appointment), new tasks entering the system, or changes to the scheduling and allocation rules, such as a change to travel times to account for adverse weather or traffic conditions). The objective is to make sure that when a technician requests a task, the task actually allocated is the most suitable task available for that technician at the time the request for work is dealt with, whether or not it is the one originally scheduled. To aid understanding the allocation and optimisation rules to be described are supported by a series of flowcharts, FIGS. 12 to 14. In FIG. 12, the reference numeral 13 refers to the flowchart represented in FIGS. 13, which operates as a subroutine, called up during the process illustrated in the flowchart of FIG. 12. Similarly, the process of FIG. 14 occurs as a subroutine in various steps of FIGS. 12 and 13.

The following terms arise in several of the rules and are defined here for convenience.

"Inaccurate": the scheduling status of an activity (e.g. task, absence, break) which is scheduled for a technician but not yet allocated to him, and for which the information on which the schedule is based has become invalid. This can occur if a technician is allocated a task which was not in the technician's original schedule, or if a task originally in the technician's schedule is allocated to another technician.

"Pending": the scheduling status of an activity (e.g. task, absence, break) which is scheduled for a technician but not yet allocated to him, and for which the information on which the schedule was based is assumed to be still accurate (i.e. has not been marked "inaccurate").

The processes illustrated in FIG. 12 to 14 will now be described. In outline these are as follows.

FIG. 12 shows the process for determining what instruction to give a technician who has just checked in (step 1200). The instruction (1211 to 1215) will usually be to carry out a task (1213), but other instructions such as taking an absence (e.g. to attend a meeting or training session, 1211), may also be issued.

FIG. 13 is the process by which a suitable task is selected.

In both the processes of FIGS. 12 and 13, a subroutine is used which determines the feasibility of the technician performing a given task. This process is illustrated in FIG. 14.

FIG. 12 illustrates the process for determining the allocation of a task for an on-line technician. When a technician checks in (step 1200) the system consults the schedule to identify the next activity for the technician (1201). If the next scheduled activity is "end of day" (i.e. the technician has no further activities already scheduled for the rest of the day), the system steps to process 13 to try to find a suitable task for the technician. If there are scheduled activities before the "end of day" activity (negative outcome to step 1201) a "pre-selection absence check" process is performed (steps 1202 to 1207). Firstly, the system checks the technician's schedule to determine if any absences are scheduled for the technician (step 1202). If there are no such absences then a next task for the technician is found using the process 13 to be described below.

If there is at least one absence then the system checks to see if the next absence is due to start within a predetermined time after the current time (step 1203). If this is the case then a check is made to establish whether the scheduled end of the absence will fall within a period within which a break must be taken (step 1204). If it will not, the technician is instructed to take the absence, e.g. to attend a meeting (step 1211), and to report back for further instructions afterwards. The database is updated (step 1216) by recording the start of the period of absence, the technician's next expected contact time is updated to be the scheduled end of the absence, and the technician's location is updated to be that of the absence.

If the technician has not yet taken a break and is scheduled to finish his absence after the latest time by which the break must be started, then the technician is instructed to go on the absence, and to take the break before next contacting the system (step 1212). The technician's schedule is updated to include the duration of the break and the absence, and the estimated travel duration to the absence location, and to record that a break has now been taken (step 1216).

Returning to step 1203, if the next absence is not yet due to start, the system allocates the best task which can be performed before the absence is due to start, (steps 1205 to 1210). The rules for this are as follows.

Step 1205 determines whether the next scheduled activity is the absence, (i.e. no task is scheduled before the scheduled absence). If so, the process searches for a task, using a process to be described later with reference to FIG. 13. However, if a task is scheduled before the absence then a feasibility test, to be described below with reference to FIG. 14, is enacted (step 1206). If the scheduled task remains feasible in the time remaining before the break must be taken, as tested by step 1206, an assessment is made as to whether the scheduled absence can still be performed after the task (step 1207). If the task passes both tests (steps 1206, 1207), then it is allocated to the technician, who receives instructions to carry it out (step 1213). However, if the scheduled task fails either test, i.e. it cannot be performed before the due time for the absence or a scheduled break, an alternative task is identified using the process of FIG. 13.

The process of allocating technicians to tasks, as illustrated in FIG. 13, will now be described. This process is one of the principal point of departure from previous systems. In such previous systems, if a technician has a predetermined schedule, he would always be allocated the next task in that schedule, if possible, or otherwise a task already in the system but not already scheduled for another technician. In such arrangements, a task new to the system since the last regular update of the scheduling system will not be allocated until the next regular update. The process described here allows the optimisation of the schedule as it affects any given technician, each time he reports for a new task, whether or not he reports in as scheduled, and whether or not a performble task is already scheduled for him to perform, and takes into account in such an optimisation even tasks which have been added to the system since the last schedule revision. This allows more time between rebuilds of the entire schedule, and therefore allows more time to be spent on each rebuilding run.

Allocation of a task to a technician other than the one scheduled to do it will only modify the schedule with respect to that technician and, if the task was originally scheduled for another technician, that other technician. Periodically during the day, a new schedule is built up. The frequency with which this is done should be selected according to the rate at which changes take place, such that the previous schedule is not totally disrupted by on-line changes before the new one is available. However, the more time that can be allowed for the generation of each new schedule, the more optimal the solutions which can be generated.

If possible, the initial schedule used in the first iteration of the optimisation stage 31 may be the current schedule, generated by the real-time optimiser 40 on the previous cycle, subject to any new fixed points added by the deterministic stage 30.

The details of the tasks which have not yet been allocated, (whether provisionally scheduled for allocation or not) are stored in the "pool of work" database 44. When considering a technician for allocation to a task the following factors are determined, to as to be used in the various repair and optimisation checks that take place:

a. The location from which the technician is deemed to be travelling to attend the task under consideration, which is considered to be the location at which the technician's current task is, or his start of day location if no task has yet been allocated.

b. Allocation start time (i.e. current time or the start of the working hours of the technician, whichever is the later).

c. The time remaining of the technician's working hours, including any scheduled overtime.

d. The location at which the technician must end his working period, which may be his home location or the location of a scheduled absence.

e. A preferred working location, and a travel radius surrounding it. Tasks located outside this radius will not be allocated to the technician.

f. A mobility limit, which is set to prevent excessive travel time from one task to another.

As illustrated in FIG. 13, in a first step (1301) a check is made to determine if any tasks are scheduled for the technician. If there is such a task, the process next uses a test 1302 (the subroutine of FIG. 14) to check whether the task is still performable if now allocated to the technician. The scheduled task may be impossible for the technician to perform as a result of unscheduled changes, notably if the technician is reporting in earlier or later than scheduled. The task is performable if all of the following conditions are satisfied:

a. The technician has sufficient time to perform the task within his scheduled working hours or, if the task has been split over the end of the day (identified by scheduled start and finish times on different dates), the proportion of the task's expected duration that the technician will be able to complete before the end of the scheduled working hours is greater than a predetermined minimum.

b. The task satisfies requirements for break management (see FIG. 14)

c. If the task is to be performed between certain times, the technician's expected arrival time on site is within this period.

d. The task has not already been allocated to a different technician.

If the next task in the technician's schedule does not pass all the above checks then the task is considered to be infeasible, otherwise it is feasible.

Whether or not there is a feasible task in the technician's provisional schedule, the system therefore now attempts to improve on the provisional schedule by running a number of tests. These are identified in FIG. 13 as tests 1303, 1304, 1306 (if there is a feasible task; i.e. if the outcome of both tests 1301 and 1302 are positive), or tests 1304A, 1306A, and 1309 (if there is no currently feasible task scheduled; i.e. if the outcome of test 1301 or test 1302 is negative). This process is designed such that if there is a feasible scheduled task, the schedule is only disturbed is there is an opportunity for significant improvement in quality of service.

Firstly, if a feasible task has been identified, a test is made to determine (step 1303) if the scheduled task is flagged as of high importance or as difficult to allocate. If so, it is allocated to the technician without any further optimisation being attempted (outcome 1308).

In all other cases (i.e. if there is no feasible task in the schedule with such a flag), the process investigates (steps 1304/1304A) whether there is a task in the pool of work 44, flagged as very important and near to its commitment time, which has not yet been scheduled. This may occur for several reasons; for example because it is a new task, or one which has been lost from another schedule elsewhere.

For reallocation of a task to the currently on-line technician the four conditions described with reference to step 1302 must all be satisfied, and also the following:

e. the task is not "firmly scheduled" to the scheduled technician (if any) by the pre-scheduler 30 f. the technician under consideration has the necessary skills and permissions to do the task;

g. the location of the task is within the technician's geographical limits.

h. the technician has the appropriate skills and permissions;

i. the task is within a predetermined period of its target time, j. the task can be performed before the technician's next fixed task.

All tasks so selected are then ordered in the following sequence;

1. Any task specifically pre-scheduled to the on-line technician.
2. Travel time to task (in increasing order).
3. Skill preferences.
4. Priority (in decreasing order)
5. Time to commitment.

Travel time may be computed from one location to another location using any known route navigation system, taking into account factors such as type of roads, time of day, etc. Where a task is scheduled but the previous task is not yet scheduled, a typical travel time factor for tasks in the general area is used. If the task is marked as "inaccurate", or a repair operation is being performed on the schedule, then the travel time must be recalculated, since the estimate for the scheduled entry will no longer be correct.

The first task in the resulting list which meets the criteria above and the break management criteria is selected for allocation to the on-line technician (step 1305). If no such task is found, a further test (step 1306/1306A) is made in which it is determined whether there is a task of higher priority than the present technician's scheduled task (if any), and not already considered in step 1304/1304A, which is already scheduled to another technician, but to which the on-line technician could attend earlier than the scheduled technician. All tasks meeting these conditions are now assessed. The same tests are used except that the requirement for the task to be close to its target time (test "i" above) is replaced by a requirement that only tasks of higher priority than the scheduled task (if any) need be considered. If a suitable task is found, it is allocated to the technician, in preference to the scheduled task, if any (step 1307).

If neither test 1304 or 1306 produces a more suitable task, the scheduled task is allocated (step 1308). However, if there is a negative outcome to both tests 1304A and 1306A (i.e. the equivalent tests when the schedule has already broken down) there is no scheduled task which can be allocated. Instead, the technician is instructed to contact his supervisor for instructions (step 1309).

In selecting tasks in steps 1304, 1304A, 1306, 1306A, a test is required to ensure that the task can be performed within its appointment time (if any). Consideration must also be given as to whether the technician should also be instructed to take a break before he next contacts the control system. A similar test is also necessary to assess the feasibility of scheduled tasks (steps 1302 and 1206). The test is illustrated in FIG. 14. There are three objectives of this process. Firstly, it ensures that breaks are taken within their allotted time windows. Secondly, it allocates a break to a technician if one is possible, and if to do so aids the allocation of a task such that the task succeeds where it would otherwise have failed (in particular through arrival too early for an appointment). Thirdly, it rejects any appointment task if the period within which the appointment falls will not coincide with the time the technician would arrive at the location if it were to be allocated to him.

The first test carried out in this process (1401) determines if a break needs to be considered. If all scheduled breaks have already been taken, the task under consideration is feasible unless the technician is unable to arrive at the task location within the appointment slot, if any. The system therefore tests firstly whether the task has an appointment timeslot (step 1402) and if so whether the technician can arrive in that slot (i.e. neither too early, which would incur idle time, nor too late: steps 1403 and 1404). If he can arrive within the appointment timeslot, or if there is no appointment timeslot, the task is feasible (1410). If he cannot arrive within the appointment slot, the task is infeasible (1413).

If the technician has a break yet to be taken, there are four possible outcomes of the test (shown as 1410 to 1413 in FIG. 14). Either the task is infeasible, (1413) or it is feasible; in the latter case it may be necessary to schedule a break before (1412) or during (1411) the task, or not at all (1410) if the task can be completed before a break has to be taken.

If the technician has not yet taken a break, then the test in step 1401 returns a positive result. In this case, the next test is again to check whether the task has an appointment time (step 1402a). If it has, then a test is made as to whether the technician is going to be too early for the appointment (step 1403a). If the technician is not going to be too early, a test is made to check whether the technician would arrive after the end of the appointment slot (step 1404a). These three tests are essentially the same as in steps 1402, 1403, and 1404, discussed above, but they lead to different outcomes. If the outcome of test 1404a is positive (in other words the technician cannot arrive until after the end of the appointment slot) the task is not feasible for that technician (outcome 1413) and a different task must be assigned to the technician. If the technician will neither be too early nor too late (outcomes of tests 1403a and 1404a both negative) then a test (step 1405) is made to check whether the task can be completed before the latest time at which the break may be started. If the outcome of this test is positive then the task is feasible, and no instructions for break are required (outcome 1410). However if the task cannot be completed before the latest time at which a break must be taken (outcome of test 1405 negative) then the next test (step 1406) is made, to determine whether it is still too early for the technician to take his break immediately. If the outcome of this test is positive, then the task is feasible but the break must be taken during the task (outcome 1411), because the outcome of test 1405 was negative, so the task cannot be completed before the end of the period within which the break must be taken. However, if the time slot within which the break may be taken has already opened (test 1406 negative), a further test (step 1408) is made to determine whether, if the technician were to take his break immediately, he would still be able to start the task before the end of the appointment timeslot. If the outcome is positive (i.e. the task is feasible if the break is taken before it) the technician is instructed to take the break and then carry out the task (outcome 1412). However, if the response to the test 1408 is negative, then the task is infeasible (outcome 1413). This is because neither the break nor the task can be completed before the latest time by which the other one must be started.

If the outcome to test 1403a (is the technician going to be too early for the appointment?) is positive then the test 1406a (analogous to test 1406) is followed: however in this instance if both the break timeslot and the appointment timeslot have not yet opened (1406a positive) then the task is infeasible (outcome 1413). If the break timeslot has already opened (1406a negative) then a further test 1407 takes place, to determine whether at the end of the technician's break the timeslot for the appointment will have opened. If it will not have done so then again the task is currently infeasible (outcome 1413). This does not mean that the technician cannot perform the task at all, but simply that it cannot be his next task. The next test, 1408, is the same as in the previous situation. It determines whether, if the break is taken, the task can be started before the end of the appointment timeslot. The outcome of this test will either be that the task is feasible and the break should be taken before the task (outcome 1412) or that the task is not feasible and some other task will have to be appointed (outcome 1413).

Finally, if the outcome of test 1402a is negative (i.e. the task does not have an appointment time) a test 1405a, analogous to test 1405, is carried out to determine whether the task can be completed before the end of the timeslot within which the break must be taken. If the outcome is positive then the task is feasible and no instructions are required for the break (outcome 1410); otherwise a further test (1409) is made to determine whether the technician would arrive at the task before the beginning of the break timeslot. If he does not (1409 negative), then the technician is instructed to take his break before starting the task (outcome 1412). Otherwise, he is instructed to take it during the task (outcome 1411).

Returning now to FIG. 12, at step 1208, if a suitable task was found by the process of FIG. 13 (outcomes 1305, 1307, 1308) this task is allocated to the technician (step 1213), together with any other instructions generated in the feasibility test (FIG. 14), e.g. to take a scheduled break before the task (1412) or during the task (step 1411). However if no valid task is found (outcome 1309) then a test is made as to whether a break can be taken (step 1209). If no break is scheduled, the technician has no work to do and is instructed to contact supervisor for instructions (step 1214), either to be authorised to finish work for the day or to await further instructions, for example in the event that a new task may come in, or enter its appointment window.

If a break can be taken (step 1209) then a test is made (step 1210) as to whether, if an absence is scheduled but not yet due to start, that absence can be taken immediately after the break. This is a test as to whether, by the time the break period has finished, the absence will be due to be taken. (Note that if the absence is already due to start the outcome of test 1203 will have been negative, so test 1204 will have been performed instead of test 1210). Depending on the outcome of this test (step 1210) the technician is instructed to take the break only (step 1215), the absence remaining in his schedule to be taken later; or to take the absence and the break together (step 1212). If no absence is scheduled (outcome of test 1202 negative) then the answer to the enquiry in step 1210 is of course always in the negative and so outcome 1212 is not relevant.

Once a task has been allocated, with or without a break, (outcomes 1211 1212, 1213 or 1215), or a decision is made that no task or other activity such as an absence or break can be allocated, (step 1214) the technician is instructed accordingly. The instructions are generated by a message generation unit 48. This may generate a display of the allocation for use by a human dispatcher to pass the instruction on to the technician T, or by transmitting a data message directly to the technician's handset (e.g. H1) over the communications link C. The revised schedule details are stored in the databases 42, 43, 44 (step 1216). For the technician register 43 these detail the current location of the technician, and the predicted completion time (i.e. the time at which the technician is next expected to come on-line requesting new instructions.) This will in general be the sum of the travel time to the new task, the expected duration of the task, and the duration of any absences and breaks which have been allocated.

The schedule 42 will also be updated. If the task allocated was that scheduled to the technician who was on-line then that entry is simply deleted as having now been allocated. If the technician was scheduled another task then, if the task allocated has come from another technician's schedule, then that entry must be deleted from the other technician's schedule. All the remaining entries in that technician's schedule are labelled "inaccurate" because they are scheduled on the assumption that he will first do the task which has now been allocated elsewhere. Similarly all the entries in the on-line technician's remaining schedule are also marked as inaccurate for the same reason. Any tasks labelled as "inaccurate" are considered to be no longer scheduled, because there is no certainty that the originally scheduled technician will still be able to perform them. In selecting tasks for allocation to other technicians "inaccurate" entries may be given a higher priority than those labelled "pending", as they are more at risk of failure through not being allocated.

Figure 15:
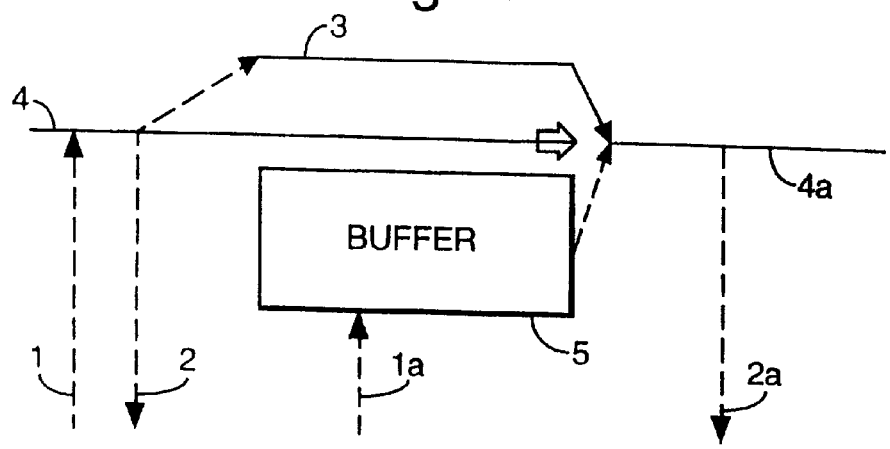
FIGS. 15, 16 and 17 illustrate three modes of operation of the system of the invention.
Figure 16:
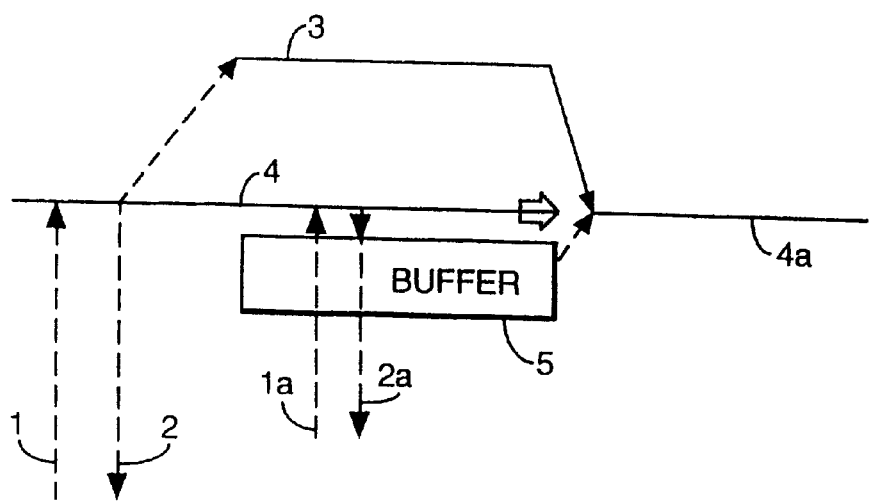
Figure 17:
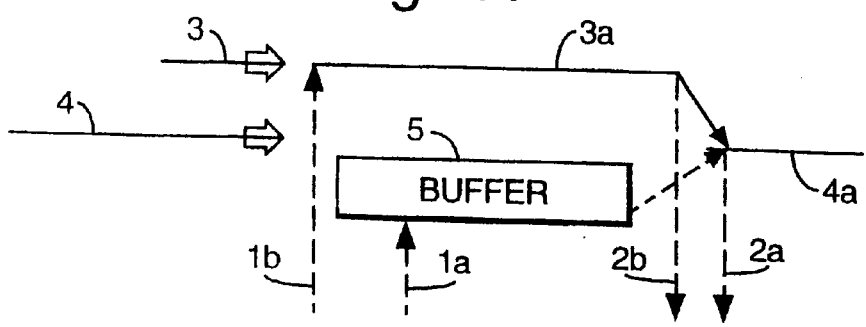

Inputs to the system, such as new tasks to add to the schedules or technicians reporting completion of tasks, which occur whilst the initial schedule generation process of FIGS. 5 to 10 is carried out, will render the initial schedule partially incorrect by the time the it schedule is produced. FIGS. 15, 16 and 17 are time lines illustrating three methods of handling such inputs.

In these three Figures such inputs are indicated by the references 1, 11a and outputs, such as instructions to technicians, in response to such inputs by the references 2, 2a. The initial schedule generation process is indicated by the references 3 and 3a, and the schedule modification process by the references 4 and 4a, it will be noted that in general the two processes 3 and 4 take place in parallel, the initial schedule generation process 3 providing an input for the next cycle of the modification process 4a.

In each case, inputs 1 occurring whilst the initial generation process is not operating are processed according to the schedule modification process 4, and any necessary ouputs 2 generated. The inputs are also provided to the next run of the initial schedule generator 3.

In FIG. 15, the schedule modification process 4 is suspended during the initial schedule generation process 3. Inputs 1a occurring whilst the initial generation process 3 is in operation are not immediately processed according to the current modification process 4, but are buffered in a store 5 until the process 3 is complete, and then processed according to the modification process 4a based on the new initial schedule, providing an output 2a.

Alternatively, in FIG. 16, an output 2a is generated immediately on receipt of an input 1a, using the modification process 4 using the existing data, but the input 1a is also buffered to provide an input to the new modification process 4a when the initial schedule 3 is complete. This has the advantage of providing a prompt response 2, whilst the arrangement of FIG. 15 has the advantage of using a more recent initial schedule to in generating the response 2a. Selection of one or other arrangement depends on the acceptable delay between an input 1a and an output 2a.

If data 1b is provided which requires substantial modification to the initial schedule, such that solutions 3,4 generated using the existing initial schedule will be invalid, the schedule modification process 4 and the initial schedule generation process 3 are suspended (if currently running) and the initial schedule generation process then restarted (3a) with the new data. Inputs 2a received during running of the restarted process 3a are buffered (5) until the new schedule is generated.

What is claimed is:

1. A task-allocation apparatus comprising:
   input means for providing information relating to tasks to be allocated and resources available to perform the tasks during a given period;
   off-line schedule generation means to allocate the resources to the tasks, thereby generating, for each resource, an initial complete schedule covering substantially all the then known tasks to be carried out during the period under consideration to instruct a user,
   storage means for storing the initial complete schedule,
   updating means for receiving, from the input means, updated information relating to the tasks and resources for said given period, the updated information being received by the input means during said given period from a source external to the apparatus, and
   on-line modifying means for modifying the initial complete schedule of at least a first a resource in response to such updated information to generate at least one modified complete schedule,
   wherein changes to the initial complete schedule may be made in response to such updated information in real time, independently of the schedule generation means; and
   the initial complete schedule is generated by the off-line schedule generation means without reacting to any change in input information provided to the off-line schedule generation means, whereas the modified complete schedule generated by the on-line modifying means reacts to said updated information.

2. Apparatus as in claim 1, wherein:

the schedule generation means is arranged to periodically generate an initial complete schedule according to data received by the input means, and the modifying means is arranged to make changes to the initial complete schedule in response to the receipt of data between such periodic generation of the initial complete schedule.

3. Apparatus as in claim 1, wherein the schedule generation means comprises:

a first, deterministic, stage;

means for selecting tasks which are to be scheduled by the first stage;

and a second, optimization, stage for scheduling the remaining tasks, wherein the second stage includes means to treat the tasks scheduled by the first stage as fixed.

4. Apparatus as in claim 3, wherein the means for selecting tasks for scheduling by the first stage is arranged to select groups of linked tasks involving more than one of the resources, or forming a sequence of tasks.

5. Apparatus as in claim 3 wherein the second stage operates according to a stochastic process.

6. Apparatus as in claim 5, wherein the stochastic process is a Simulated Annealing process.

7. Apparatus as in claim 3 wherein the schedule generation means comprises a third, post-optimization stage, comprising:

means for analyzing the schedules created by the second stage, means for identifying schedules requiring further optimization, and means for inputting such schedules into a further iteration of the second stage for further optimization, the further iteration of the second stage having means to treat the schedules not so identified as fixed.

8. Apparatus as in claim 1 wherein the schedule modifying means comprises:

a plurality of selection means, each for assessing in turn the plurality of tasks waiting to be performed to determine if a task of a given priority suitable for performance by the first resource is available, and allocating such a task to the first resource, the selection means being arranged to identify tasks of successively descending priority, such that tasks of high priority are allocated in preference to lower priority tasks in the initial optimized schedule for the first resource.

9. Apparatus as in claim 8, wherein at least one of the selection means comprises:

first assessment means for determining if the initial optimized schedule of the first resource includes a task of the given priority, and selecting said task if present, and second assessment means, operable if the initial optimized schedule of the first resource does not contain such a task, for determining if a task exists which has not been scheduled, and selecting said task if present.

10. A task-allocation apparatus comprising:

input means for providing information relating to tasks to be allocated and resources available to perform the tasks;

off-line schedule generation means to allocate the resources to the tasks, thereby generating, for each resource, an initial schedule to instruct a user;

storage means for storing the initial schedules;

updating means for receiving, from the input means, updated information relating to the tasks and resources, the updated information being received by the input means from a source external to the apparatus during a period of time in which tasks allocated in the initial schedule are performed;

on-line modifying means for modifying the initial schedule of at least a first resource in response to such updated information to generate at least one modified schedule;

whereby changes to the initial schedules may be made in response to such updated information in real time, independently of the schedule generation means;

wherein the schedule modifying means comprises means to identify resources having characteristics related to those of the first resource, and arranged to modify the schedules of only those resources having such characteristics in response to the updated information; and the initial schedule is generated by the off-line schedule generation means without reacting to any change in input information provided to the off-line schedule generation means, whereas the modified schedule generated by the on-line modifying means reacts to said updated information.

11. A task-allocation apparatus comprising:

input means for providing information relating to tasks to be allocated and resources available to perform the tasks during a given period;

off-line schedule generation means to allocate the resources to the tasks, thereby generating, for each resource, an initial complete schedule covering substantially all the then known tasks to be carried out during the period under consideration to instruct a user, storage means for storing the initial complete schedule, updating means for receiving, from the input means, updated information relating to the tasks and resources for said given period, the updated information being received by the input means during said given period from a source external to the apparatus, on-line modifying means for modifying the initial complete schedule of at least a first resource in response to such updated information to generate at least one modified complete schedule, whereby changes to the initial complete schedule may be made in response to such updated information in real time, independently of the schedule generation means;

means for adding in real time, after generation of the initial schedule and during said given period, further tasks and/or resources to the plurality of tasks and/or resources to be scheduled; and wherein the initial complete schedule is generated by the off-line schedule generation means without reacting to any change in input information provided to the off-line schedule generation means, whereas the modified complete schedule generated by the on-line modifying means reacts to said updated information.

12. A method of allocating a plurality of resources to a plurality of tasks, the method comprising the use of a computer to perform the following functions:

providing initial information relating to the tasks to be allocated and the resources available to perform the tasks during a given period, generating, off-line, for each resource an initial complete schedule to allocate the resources to the tasks covering substantially all the then known tasks to be carried out during the period under consideration to instruct a user, storing the initial complete schedule, providing updated information relating to the tasks and resources received by the computer during said given period from a source external to the computer, and modifying, on-line, the initial complete schedule of at least a first resource in response to such updated information to generate a modified complete schedule, whereby changes to individual schedules may be made in response to such updated information in real time and independently of the process of generating the initial complete schedule; and the initial complete schedule is generated without reacting to any change in the initial information used to generate the initial complete schedule, whereas the modified complete schedule is generated by reacting to said updated information.

13. Method as in claim 12, wherein initial complete schedules are generated periodically, and the initial complete schedules so generated are modified in response to the receipt of data between such periodic generation of the initial complete schedules.

14. A method of allocating a plurality of resources to a plurality of tasks, the method comprising the use of a computer to perform the following functions:

providing initial information relating to the tasks to be allocated and the resources available to perform the tasks during a given period;

generating, off-line, for each resource, an initial schedule to allocate the resources to the tasks to instruct a user;

storing the initial schedules;

providing updated information relating to the tasks and resources received by the computer during said given period from a source external to the computer;

modifying, on-line, the initial schedule of at least a first resource in response to such updated information to generate a modified schedule;

whereby changes to individual schedules may be made in response to such updated information in real time and independently of the process of generating the initial schedules;

wherein initial schedules are generated periodically, and the initial schedules so generated are modified in response to the receipt of data between such periodic generation of the initial schedules;

during the periodic generation of the initial schedules the modification process is suspended, the updated information being retained until the new initial schedules are generated, and then used to modify the initial schedules when their generation is complete; and the initial schedule is generated without reacting to any change in the initial information used to generate the initial schedule, whereas the modified schedule is generated by reacting to said updated information.

15. A method of allocating a plurality of resources to a plurality of tasks, the method comprising the use of a computer to perform the following functions:

providing initial information relating to the tasks to be allocated and the resources available to perform the tasks during a given period;

generating, off-line, for each resource, an initial schedule to allocate the resources to the tasks to instruct a user;

storing the initial schedules;

providing updated information relating to the tasks and resources received by the computer during said given period from a source external to the computer;

modifying, on-line, the initial schedule of at least a first resource in response to such updated information to generate a modified schedule;

whereby changes to individual schedules may be made in response to such updated information in real time and independently of the process of generating the initial schedules;

wherein initial schedules are generated periodically, and the initial schedules so generated are modified in response to the receipt of data between such periodic generation of the initial schedules;

wherein during the generation of the initial schedules the modification process continues, the schedules so modified being input as modifications to the initial schedules when their generation is complete; and the initial schedule is generated without reacting to any change in the initial information used to generate the initial schedule, whereas the modified schedule is generated by reacting to said updated information.

16. Method as in claim 12 wherein the schedule generation process is initiated if a substantial update data item is received.

17. Method as in claim 12 wherein the schedule generation function comprises:

a first deterministic stage for scheduling selected tasks, and a second optimization stage for scheduling the remaining tasks, wherein the second stage treats the tasks scheduled by the first stage as fixed.

18. Method as in claim 17 in which groups of linked tasks involving more than one of the resources, or forming a sequence of tasks are selected for scheduling by the first, deterministic, stage.

19. Method as in claim 17 wherein the second stage operates according to a stochastic process.

20. Method as in claim 19, wherein the stochastic process is a Simulated Annealing process.

21. Method as in claim 17 wherein the schedule generation function comprises a third, post-optimization stage, in which the schedules created by the second stage are analyzed to identify schedules requiring further optimization, and such schedules are input into a further iteration of the second stage for further optimization, the further iteration of the second stage treating as fixed the schedules not so identified.

22. Method as in claim 12 wherein the schedule modifying process comprises a plurality of selection steps, in each of which:

the plurality of tasks waiting to be performed is assessed to determine if a task of a given priority suitable for performance by the first resource is available, and such a task is allocated to the first resource if identified, the selection steps each being arranged to identify tasks of successively descending priority, such that a task of high priority is allocated in preference to one of lower priority, whether or not the high priority task is in the initial optimized schedule for the first resource.

23. Method as in claim 22, wherein at least one of the selection steps:

first determines whether the initial optimized schedule of the resource includes a task of the given priority, and selects said task if present or, if the initial optimized schedule of the resource does not contain such a task, determines if a task exists which has not been scheduled, and selects such a task if present.

24. A method of allocating a plurality of resources to a plurality of tasks, the method comprising the use of a computer to perform the following functions:

providing initial information relating to the tasks to be allocated and the resources available to perform the tasks during a given period;

generating, off-line, for each resource, an initial schedule to allocate the resources to the tasks to instruct a user;

storing the initial schedules;

providing updated information relating to the tasks and resources received by the computer during said given period from a source external to the computer;

modifying, on-line, the initial schedule of at least a first resource in response to such updated information to generate a modified schedule;

whereby changes to individual schedules may be made in response to such updated information in real time and independently of the process of generating the initial schedules;

wherein the schedule modification function identifies resources having characteristics related to those of the first resource, and modifies the schedules of only those resources having such characteristics; and the initial schedule is generated without reacting to any change in the initial information used to generate the initial schedule, whereas the modified schedule is generated by reacting to said updated information.

25. A method of allocating a plurality of resources to a plurality of tasks, the method comprising the use of a computer to perform the following functions:

providing initial information relating to the tasks to be allocated and the resources available to perform the tasks during a given period, generating, off-line, for each resource an initial complete schedule to allocate the resources to the tasks covering substantially all the then known tasks to be carried out during the period under consideration to instruct a user, storing the initial complete schedule, providing updated information relating to the tasks and resources received by the computer during said given period from a source external to the computer, modifying, on-line, the initial complete schedule of at least a first resource in response to such updated information to generate a modified complete schedule, whereby changes to individual schedules may be made in response to such updated information in real time and independently of the process of generating the initial complete schedule;

wherein further tasks may be added to the plurality of tasks to be performed after generation of the initial optimized schedule; and the initial complete schedule is generated without reacting to any change in the initial information used to generate the initial schedule, whereas the modified complete schedule is generated by reacting to said updated information.

26. A computer apparatus for allocating a plurality of tasks to a plurality of resources during a given period, said computer apparatus comprising:

a central processing unit, a memory, an input device and an output device, said memory containing a program for controlling the computer and which is arranged to generate, off-line, and store an initial complete schedule covering substantially all the then known tasks to be carried out during the period under consideration to instruct a user, based on predicted availability of resources, task priorities, and suitability of tasks to resources, the initial complete schedule being generated without reacting to any change in input information used to generate the initial complete schedule and performing the following steps:

when a resource becomes available, assessing, on-line, the plurality of tasks waiting to be performed in real time, to determine if a high priority task suitable for performance by the resource is available, and, if so, allocating it to the resource;

if no such task is available for the resource to perform, assessing the next task on the resource's initial complete schedule to determine if it can be performed, and allocating it to the resource if it can be performed;

if said next task is not available for the resource to perform, allocating to the resource a lower priority task from the plurality of tasks.

27. Apparatus as in claim 10 wherein the schedule generation means is arranged to periodically generate initial schedules according to the data received by the input means, and the modifying means is arranged to make changes to the initial schedules in response to the receipt of data between such periodic generation of the initial schedules.

28. Apparatus as in claim 10 wherein the schedule generation means comprises:

a first, deterministic, stage;

means for selecting tasks which are to be scheduled by the first stage;

and a second, optimization, stage for scheduling the remaining tasks;

wherein the second stage includes means to treat the tasks scheduled by the first stage as fixed.

29. Apparatus as in claim 28 wherein the means for selecting tasks for scheduling by the first stage is arranged to select groups of linked tasks involving more than one of the resources, or forming a sequence of tasks.

30. Apparatus as in claim 28 wherein the second stage operates according to a stochastic process.

31. Apparatus as in claim 30 wherein the stochastic process is a Simulated Annealing process.

32. Apparatus as in claim 28 wherein the schedule generation means comprises a third, post-optimization stage, comprising means for analyzing the schedules created by the second stage, means for identifying schedules requiring further optimization, and means for inputting such schedules into a further iteration of the second stage for further optimization, the further iteration of the second stage having means to treat the schedules not so identified as fixed.

33. Apparatus as in claim 10 wherein the schedule modifying means comprises a plurality of selection means, each for assessing in turn the plurality of tasks waiting to be performed to determine if a task of a given priority suitable for performance by the first resource is available, and allocating such a task to the first resource, the selection means being arranged to identify tasks of successively descending priority, such that tasks of high priority are allocated in preference to lower priority tasks in the initial optimized schedule for the first resource.

34. Apparatus as in claim 33 wherein at least one of the selection means comprises first assessment means for determining if the initial optimized schedule of the first resource includes a task of the given priority, and selecting said task if present, and second assessment means, operable if the initial optimized schedule of the first resource does not contain such a task, for determining if a task exists which has not been scheduled, and selecting said task if present.

35. Apparatus as in claim 10 further comprising means for adding, after generation of the initial optimized schedule, further tasks and/or resources to the plurality of tasks and/or resources to be scheduled.

36. Method as in claim 14 wherein initial schedules are generated periodically, and the initial schedules so generated are modified in response to the receipt of data between such periodic generation of the initial schedules.

37. Method as in claim 14 wherein the schedule generation process is initiated if a substantial update data item is received.

38. Method as in claim 14 wherein the schedule generation function comprises a first deterministic stage for scheduling selected tasks, and a second optimization stage for scheduling the remaining tasks, wherein the second stage treats the tasks scheduled by the first stage as fixed.

39. Method as in claim 38 in which groups of linked tasks involving more than one of the resources, or forming a sequence of tasks are selected for scheduling by the first, deterministic, stage.

40. Method as in claim 38 wherein the second stage operates according to a stochastic process.

41. Method as in claim 40 wherein the stochastic process is a Simulated Annealing process.

42. Method as in claim 38 wherein the schedule generation function comprises a third, post-optimization stage, in which the schedules created by the second stage are analyzed to identify schedules requiring further optimization, and such schedules are input into a further iteration of the second stage for further optimization, the further iteration of the second stage treating as fixed the schedules not so identified.

43. Method as in claim 14 wherein the schedule modifying process comprises a plurality of selection steps, in each of which the plurality of tasks waiting to be performed is assessed to determine if a task of a given priority suitable for performance by the first resource is available, and such a task is allocated to the first resource if identified, the selection steps each being arranged to identify tasks of successively descending priority, such that a task of high priority is allocated in preference to one of lower priority, whether or not the high priority task is in the initial optimized schedule for the first resource.

44. Method as in claim 43 wherein at least one of the selection steps first determines whether the initial optimized schedule of the resource includes a task of the given priority, and selects said task if present or, if the initial optimized schedule of the resource does not contain such a task, determines if a task exists which has not been scheduled, and selects such a task if present.

45. Method as in claim 14 wherein further tasks may be added to the plurality of tasks to be performed after generation of the initial optimized schedule.

46. Method as in claim 15 wherein initial schedules are generated periodically, and the initial schedules so generated are modified in response to the receipt of data between such periodic generation of the initial schedules.

47. Method as in claim 15 wherein the schedule generation process is initiated if a substantial update data item is received.

48. Method as in claim 15 wherein the schedule generation function comprises a first deterministic stage for scheduling selected tasks, and a second optimization stage for scheduling the remaining tasks, wherein the second stage treats the tasks scheduled by the first stage as fixed.

49. Method as in claim 48 in which groups of linked tasks involving more than one of the resources, or forming a sequence of tasks are selected for scheduling by the first, deterministic, stage.

50. Method as in claim 48 wherein the second stage operates according to a stochastic process.

51. Method as in claim 50 wherein the stochastic process is a Simulated Annealing process.

52. Method as in claim 48 wherein the schedule generation function comprises a third, post-optimization stage, in which the schedules created by the second stage are analyzed to identify schedules requiring further optimization, and such schedules are input into a further iteration of the second stage for further optimization, the further iteration of the second stage treating as fixed the schedules not so identified.

53. Method as in claim 15 wherein the schedule modifying process comprises a plurality of selection steps, in each of which the plurality of tasks waiting to be performed is assessed to determine if a task of a given priority suitable for performance by the first resource is available, and such a task is allocated to the first resource if identified, the selection steps each being arranged to identify tasks of successively descending priority, such that a task of high priority is allocated in preference to one of lower priority, whether or not the high priority task is in the initial optimized schedule for the first resource.

54. Method as in claim 53 wherein at least one of the selection steps first determines whether the initial optimized schedule of the resource includes a task of the given priority, and selects said task if present or, if the initial optimized schedule of the resource does not contain such a task, determines if a task exists which has not been scheduled, and selects such a task if present.

55. Method as in claim 15 wherein further tasks may be added to the plurality of tasks to be performed after generation of the initial optimized schedule.

56. Method as in claim 24 wherein initial schedules are generated periodically, and the initial schedules so generated are modified in response to the receipt of data between such periodic generation of the initial schedules.

57. Method as in claim 24 wherein the schedule generation process is initiated if a substantial update data item is received.

58. Method as in claim 24 wherein the schedule generation function comprises a first deterministic stage for scheduling selected tasks, and a second optimization stage for scheduling the remaining tasks, wherein the second stage treats the tasks scheduled by the first stage as fixed.

59. Method as in claim 58 in which groups of linked tasks involving more than one of the resources, or forming a sequence of tasks are selected for scheduling by the first, deterministic, stage.

60. Method as in claim 58 wherein the second stage operates according to a stochastic process.

61. Method as in claim 60 wherein the stochastic process is a Simulated Annealing process.

62. Method as in claim 58 wherein the schedule generation function comprises a third, post-optimization stage, in which the schedules created by the second stage are analyzed to identify schedules requiring further optimization, and such schedules are input into a further iteration of the second stage for further optimization, the further iteration of the second stage treating as fixed the schedules not so identified.

63. Method as in claim 24 wherein the schedule modifying process comprises a plurality of selection steps, in each of which the plurality of tasks waiting to be performed is assessed to determine if a task of a given priority suitable for performance by the first resource is available, and such a task is allocated to the first resource if identified, the selection steps each being arranged to identify tasks of successively descending priority, such that a task of high priority is allocated in preference to one of lower priority, whether or not the high priority task is in the initial optimized schedule for the first resource.

64. Method as in claim 63 wherein at least one of the selection steps first determines whether the initial optimized schedule of the resource includes a task of the given priority, and selects said task if present or, if the initial optimized schedule of the resource does not contain such as task, determines if a task exists which has not been scheduled, and selects such a task if present.

65. Method as in claim 24 wherein further tasks may be added to the plurality of tasks to be performed after generation of the initial optimized schedule.

66. Apparatus as in claim 11 wherein:
the schedule generation means is arranged to periodically generate an initial complete schedule according to data received by the input means, and
the modifying means is arranged to make changes to the initial complete schedule in response to the receipt of data between such periodic generation of the initial complete schedule.

67. Apparatus as in claim 11 wherein the schedule generation means comprises:
a first, deterministic, stage;
means for selecting tasks which are to be scheduled by the first stage;
and a second, optimization, stage for scheduling the remaining tasks,
wherein the second stage includes means to treat the tasks scheduled by the first stage as fixed.

68. Apparatus as in claim 67 wherein the means for selecting tasks for scheduling by the first stage is arranged to select groups of linked tasks involving more than one of the resources, or forming a sequence of tasks.

69. Apparatus as in claim 67 wherein the second stage operates according to a stochastic process.

70. Apparatus as in claim 69 wherein the stochastic process is a Simulated Annealing process.

71. Apparatus as in claim 67 wherein the schedule generation means comprises a third, post-optimization stage, comprising:
means for analyzing the schedules created by the second stage,
means for identifying schedules requiring further optimization, and
means for inputting such schedules into a further iteration of the second stage for further optimization,
the further iteration of the second stage having means to treat the schedules not so identified as fixed.

72. Apparatus as in claim 11 wherein the schedule modifying means comprises:

a plurality of selection means, each for assessing in turn the plurality of tasks waiting to be performed to determine if a task of a given priority suitable for performance by the first resource is available, and allocating such a task to the first resource,
the selection means being arranged to identify tasks of successively descending priority, such that tasks of high priority are allocated in preference to lower priority tasks in the initial optimized schedule for the first resource.

73. Apparatus as in claim 72 wherein at least one of the selection means comprises:
first assessment means for determining if the initial optimized schedule of the first resource includes a task of the given priority, and selecting said task if present, and
second assessment means, operable if the initial optimized schedule of the first resource does not contain such a task, for determining if a task exists which has not been schedule, and selecting said task if present.

74. Apparatus as in claim 11 wherein the schedule modifying means comprises means to identify resources having characteristics related to those of the first resource, and arranged to modify the schedules of only those resources having such characteristics in response to the updated information.

75. Method as in claim 25 wherein initial complete schedules are generated periodically, and the initial complete schedules so generated are modified in response to the receipt of data between such periodic generation of the initial complete schedules.

76. Method as in claim 25 wherein during the periodic generation of the initial schedules the modification process is suspended, the updated information being retained until the new initial schedules are generated, and then used to modify the initial schedules when their generation is complete.

77. Method as in claim 25 wherein during generation of the initial schedules the modification process continues, the schedules so modified being input as modifications to the initial schedules when their generation is complete.

78. Method as in claim 25 wherein the schedule generation process is initiated if a substantial update data item is received.

79. Method as in claim 25 wherein the schedule generation function comprises:
a first deterministic stage for scheduling selected tasks, and
a second optimization stage for scheduling the remaining tasks, wherein the second stage treats the tasks scheduled by the first stage as fixed.

80. Method as in claim 79 in which groups of linked tasks involving more than one of the resources, or forming a sequence of tasks are selected for scheduling by the first, deterministic, stage.

81. Method as in claim 79 wherein the second stage operates according to a stochastic process.

82. Method as in claim 81 wherein the stochastic process is a Simulated Annealing process.

83. Method as in claim 79 wherein the schedule generation function comprises a third, post-optimization stage, in which the schedules created by the second stage are analyzed to identify schedules requiring further optimization, and such schedules are input into a further iteration of the second stage for further optimization, the further iteration of the second stage treating as fixed the schedules not so identified.

84. Method as in claim 25 wherein the schedule modifying process comprises a plurality of selection steps, in each of which:

the plurality of tasks waiting to be performed is assessed to determine if a task of a given priority suitable for performance by the first resource is available, and such a task is allocated to the first resource if identified, the selection steps each being arranged to identify tasks of successively descending priority, such that a task of high priority is allocated in preference to one of lower priority, whether or not the high priority task is in the initial optimized schedule for the first resource.

85. Method as in claim 84 wherein at least one of the selection steps:

first determines whether the initial optimized schedule of the resource includes a task of the given priority, and selects said task if present or, if the initial optimized schedule of the resource does not contain such a task, determines if a task exists which has not been schedule, and selects such a task if present.

86. A method of using a computer system to assign resources to perform tasks, the method comprising:

receiving first data relating to tasks and resources to perform the tasks;

generating, off-line, a first schedule based on the first data, the first schedule initially assigning the resources to perform the tasks during a given time period;

outputting the first schedule to a user before said given time period begins;

receiving second data relating at least to a task from a source external to the computer system and after the first schedule has been generated;

generating, on-line, a second schedule based on at least the second data in real time, the second schedule assigning the resources to perform the tasks during the given time period in a manner at least partially different than the first schedule;

outputting the second schedule to the user after said given period has begun; and wherein the first schedule is generated without reacting to any change to the first data, whereas the second schedule is generated by reacting to changes to the second data in real time.

87. A method as in claim 86, wherein the second schedule is generated by modifying the first schedule and without re-generating the first schedule.

88. A method as in claim 86, wherein the second data is received by the computer system through a manual interface.

89. A method as in claim 86, wherein the second data is received by the computer system through input from an electronic device.

90. A method as in claim 86, wherein the task represented by the second data is not represented by any of the tasks represented by the first data.

91. A method as in claim 86, wherein the second data is received during said given time period that tasks are performed.

92. A method of using a computer system to instruct a user, the method comprising:

generating, off-line, a first schedule assigning a user to perform a plurality of tasks during a given period;

outputting the first schedule to instruct the user to perform the plurality of tasks;

receiving data in real time relating to another task, the another task not previously included in the plurality of tasks, from a source external to the computer system after the first schedule has been generated;

generating, on-line and in real time, a second schedule based on at least the data relating to the another task, the second schedule assigning the tasks to be performed by the user in a manner at least partially different than the first schedule;

outputting the second schedule to the user after said given period has begun; and wherein the first schedule is generated without reacting to changes in data used to generate the first schedule whereas the second schedule is generated by reacting to changes in the data received in real time.

93. A method as in claim 92, wherein the second schedule is output to the user upon receipt of an on-line request from the user.

94. A method as in claim 92, wherein the received data is received during said given period that tasks are performed.

95. A method of using a computer system to assign resources to perform tasks, the method comprising:

receiving first data relating to tasks and resources to perform the tasks;

generating, off-line, a first schedule based on the first data, the first schedule initially assigning the resources to perform the tasks during a given time period;

outputting the first schedule to a user before said given time period has begun;

receiving second data relating at least to a task from a source external to the computer system and after said given time period has begun, the second data reflecting real time circumstances;

generating, on-line, a second schedule based on at least the second data in real time, the second schedule assigning the resources to perform the tasks represented by the first and second data during the given time period in a manner at least partially, different than the first schedule; and outputting the second schedule to the user after said given period has begun; and wherein the first schedule is generated without reacting to any change to the first data, whereas the second schedule is generated by reacting to changes to the second data in real time.

96. An apparatus as in claim 1, wherein the initial complete schedule is generated with a comparatively more rigorous computer process than a computer process used to generate the modified complete schedule.

97. An apparatus as in claim 10, wherein the initial schedule is generated with a comparatively more rigorous computer process than a computer process used to generate the modified schedule.

98. An apparatus as in claim 11, wherein the initial complete schedule is generated with a comparatively more rigorous computer process than a computer process used to generate the modified complete schedule.

99. The method as in claim 12 wherein the initial complete schedule is generated with a comparatively more rigorous computer process than a computer process used to generate the modified complete schedule.

100. The method as in claim 14 wherein the initial schedule is generated with a comparatively more rigorous computer process than a computer process used to generate the modified schedule.

101. The method as in claim 15 wherein the initial schedule is generated with a comparatively more rigorous computer process than a computer process used to generate the modified schedule.

102. The method as in claim 24 wherein the initial schedule is generated with a comparatively more rigorous computer process than a computer process used to generate the modified schedule.

103. The method as in claim 25 wherein the initial complete schedule is generated with a comparatively more rigorous computer process than a computer process used to generate the modified complete schedule.

104. An apparatus as in claim 26, wherein the initial complete schedule is generated with a comparatively more rigorous computer process than a computer process used to assess, on-line, the plurality of tasks waiting to be performed in real time.

105. The method as in claim 86 wherein the first schedule is generated with a comparatively more rigorous computer process than a computer process used to generate the second schedule.

106. The method as in claim 92 wherein the first schedule is generated with a comparatively more rigorous computer process than a computer process used to generate the second schedule.

107. The method as in claim 95 wherein the first schedule is generated with a comparatively more rigorous computer process than a computer process used to generate the second schedule.

* * * * *